US007446696B2

(12) United States Patent
Kondo et al.

(10) Patent No.: US 7,446,696 B2
(45) Date of Patent: Nov. 4, 2008

(54) RADIO OSCILLATING AND RADAR SYSTEMS

(75) Inventors: Jungo Kondo, Nishikamo-Gun (JP); Osamu Mitomi, Nagoya (JP); Kenji Aoki, Ichinomiya (JP); Takashi Yoshino, Ama-Gun (JP); Keiji Matsuhiro, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/619,743

(22) Filed: Jan. 4, 2007

(65) Prior Publication Data
US 2007/0166053 A1    Jul. 19, 2007

Related U.S. Application Data

(63) Continuation of application No. PCT/JP2005/013201, filed on Jul. 11, 2005.

(30) Foreign Application Priority Data

Jul. 14, 2004  (JP) ............... 2004-207488
Feb. 22, 2005  (JP) ............... 2005-045168

(51) Int. Cl.
*G01S 7/35*    (2006.01)
*G01S 13/34*   (2006.01)
*G01S 13/00*   (2006.01)
*G01S 13/93*   (2006.01)

(52) U.S. Cl. .............. 342/52; 342/54; 342/70; 342/82; 342/118; 342/128; 342/175; 180/167; 180/169

(58) Field of Classification Search ......... 180/167–169; 701/300, 301; 342/27, 28, 70–72, 175, 195, 342/52, 54, 159, 200–205, 368–377, 59, 342/82, 89, 118, 128–133
See application file for complete search history.

(56) References Cited

U.S. PATENT DOCUMENTS 3,430,240 A * 2/1969 Loesch .................. 342/201
3,483,387 A * 12/1969 Luther, Jr. ............. 342/201
4,258,363 A * 3/1981 Bodmer et al. ......... 342/368

(Continued)

FOREIGN PATENT DOCUMENTS

JP    07-050637 A1    2/1995

(Continued)

OTHER PUBLICATIONS

U.S. Appl. 11/520,987 filed on Sep. 14, 2006, Kondo et al.

*Primary Examiner*—Bernarr E Gregory
(74) *Attorney, Agent, or Firm*—Burr & Brown

(57) ABSTRACT

The present invention provides a radio signal radiation system that alleviates the necessity of a highly specified pass band reception filter and a high performance/reliability amplifier. The radio signal radiation system includes an optical modulator; a light source for inputting an optical carrier wave into the optical modulator; a power source for applying a modulating signal having a frequency Fm on the optical modulator to superimpose a sideband wave onto the carrier wave, the modulating signal having an amplitude of N-times the drive voltage of the optical modulator; a light receiver to receive and convert the outgoing light into an electrical signal; and a radiating means for radiating a radio signal based on the electrical signal, wherein the sideband wave is superimposed at a position shifted by n×fm.

22 Claims, 26 Drawing Sheets

U.S. PATENT DOCUMENTS

| | | | | |
|---|---|---|---|---|
| 4,329,686 A | * | 5/1982 | Mourou | 342/202 |
| 4,739,334 A | * | 4/1988 | Soref | 342/368 |
| 4,885,589 A | * | 12/1989 | Edward et al. | 342/175 |
| 5,117,239 A | * | 5/1992 | Riza | 342/375 |
| 5,231,405 A | * | 7/1993 | Riza | 342/375 |
| 5,247,309 A | * | 9/1993 | Reich | 342/368 |
| 5,566,382 A | * | 10/1996 | Worchesky et al. | 342/54 |
| 5,751,242 A | * | 5/1998 | Goutzoulis et al. | 342/375 |
| 5,991,067 A | | 11/1999 | Minakata et al. | |
| 6,400,494 B1 | | 6/2002 | Kondo et al. | |
| 6,466,159 B1 | * | 10/2002 | Rotgans | 342/175 |
| 6,556,727 B2 | | 4/2003 | Minakata et al. | |
| 6,571,026 B2 | | 5/2003 | Kondo et al. | |
| 6,819,851 B2 | | 11/2004 | Aoki et al. | |
| 6,870,499 B2 | * | 3/2005 | Burns | 342/159 |
| 7,053,814 B2 | * | 5/2006 | Yap | 342/54 |
| 2002/0159738 A1 | | 10/2002 | Aoki et al. | |

FOREIGN PATENT DOCUMENTS

| | | |
|---|---|---|
| JP | 09-211402 | 8/1997 |
| JP | 10-082921 | 3/1998 |
| JP | 2001-066561 | 3/2001 |
| JP | 2001-235714 | 8/2001 |
| JP | 2002-162465 A1 | 6/2002 |
| JP | 2002-169133 | 6/2002 |
| JP | 2002-357797 A1 | 12/2002 |

* cited by examiner oscillation of fourth-order wave

———— : conversion efficiency

······ : suppression ratio

RADIO OSCILLATING AND RADAR SYSTEMS

This application is a continuation of Patent Cooperation Treaty application PCT/JP2005/013201 filed Jul. 11, 2005.

FIELD OF THE INVENTION

The present invention relates to radio signal radiation systems and radar systems.

BACKGROUND OF THE INVENTION

In Intelligent Transport Systems (ITS), it has been widely demanded a radar system utilizing radio wave such as an on-vehicle radar system. It has recently been developed, and partly commercialized, a radar system utilizing radio wave of 76 GHz band.

An on-vehicle radar system is provided on the front side of a vehicle body so that it can measure the direction, distance and relative velocity of a car running ahead of the vehicle body to function as a sensor for preventing a car accident. It will be strongly demanded that an auto cruise control (ACC) system controls the speed of a vehicle and assures a safe distance between cars. It is thus required to detect obstacles on the sides of the vehicle, such as passing vehicles and a human, for the lane selection and obstacles behind the vehicle to assist in parking and prevent car accidents, as well as obstacles ahead of the vehicle body. It has been thus increasingly demanded to provide many radars on the vehicle body.

As shown in FIG. 1, a prior millimeter-wave radar system has an FM modulator, a local oscillator, a power amplifier and multiplier, an electric divider, a transmitting antenna, a receiving antenna and a mixer. Although the RF parts are composed of MMIC, the high cost is a problem to be solved for wider acceptance. Although it is demanded to equip a plurality of radar systems as described above, such equipment would be very difficult in a practical view because the cost of the RF parts are high as described above.

It is further necessary to reduce the distance of transmission as possible on the viewpoint of losses between the oscillator and electrical divider and between the transmitting antenna and mixer. Since the oscillator is thus provided near the antenna, the oscillator is required to have high reliability under severe circumstances. On the other hand, it is strongly demanded to have stability of frequency, low noise intensity and low phase noise as a radar system. Satisfying both of the above demanded properties increases the cost of the oscillator.

Japanese Patent publication No. 2002-162465A disclosed a radar system with a sub-carrier light source using a mode locking laser. According to the system, outgoing light can be divided into a plurality of routes by means of an optical fiber and an optical divider. It is thus possible to radiate multiple radio signals using a single oscillator and to considerably reduce the number of parts necessary for the RF units, so that the cost can be reduced. It is further possible to select the positions of oscillators, so as to relax the requirements for the oscillators and to further reduce the costs.

SUMMARY OF THE INVENTION

According to a radar system using s sub-carrier light source such as a mode locking laser system, many signals are observed at an interval according to optional longitudinal mode in the oscillation spectrum. A plurality of radio signals are inevitably oscillated other than the desired signal of beat frequency. The thus generated radio signals are reflected by an object. It is thus needed to provide a frequency filter on the reception side, and to narrowly specify the pass band filter to eliminate many of the unnecessary radio signals.

Further, an oscillator of 76 GHz band is necessary for generating radio signals of 76 GHz band using a mode locking laser system. Such oscillation required a high cost due to the above two reasons.

Further, according to a sub-carrier light source such as a mode locking laser system, radio signals are oscillated having unnecessary frequencies as described above. The efficiency is low in the terms of energy, and it is thus difficult to assure a necessary output power of radio signal, particularly when the light is divided into plural routes. It is needed an optical amplifier or an electric amplifier of a large scale and high performance for assuring a predetermined output power of radio signal.

An object of the present invention is to alleviate the necessity of a reception filter of severe specification of pass band and a radio signal generating system and an amplifier of high performance and high reliability, in a radio signal radiation system for a radar system, and to provide a radio signal radiation system of improved practical use.

The present invention provides a radio signal radiation system for radiating a radio signal: the system comprising;

an optical modulator;

a modulating means for modulating an optical carrier wave passing through said optical modulator so as to superimpose a sideband wave onto the carrier wave;

an optical receiver for oscillation to receive outgoing light from the optical modulator and to convert the outgoing light into an electrical signal; and a radiating means for radiating a radio signal based on the electrical signal.

The present invention further provides a radar system comprising the radio signal radiation system and a receiving means for receiving a signal reflected from an object, wherein information concerning the object is obtained based on the received signal and the radiated radio signal.

The present inventors have invented a radar system using an optical modulator such as a modulator of optical intensity or phase, instead of a sub-carrier light source such as a mode locking laser. The principles are described referring to a schematic view of FIG. 2.

A radio signal radiation system of FIG. 2 has a light source 1, an optical modulator 2, a power source 6 for modulation, an optical receiver 7 and a means 8 for radiating radio signal. The optical modulator 2 has an optical waveguide substrate 3, an optical waveguide 5 of a predetermined pattern provided on the substrate 3, and electrodes 4 for modulating light propagating in the optical waveguide 5.

The light source 1 oscillates a carrier wave of a frequency "fo" as an arrow "A", which is incident into an optical waveguide 5. As schematically shown in FIG. 3, "Vπ" represents the driving voltage of the modulator. At an operational point of λ/4 of the optical modulator, a modulating signal of a frequency "fm" and a driving voltage of ±Vπ/2 is inputted on the modulator electrodes. The optical modulator 2 then generates modulated light (sideband wave) of a frequency of fm. When this is plotted as frequency axis, as shown in FIG. 2, carrier waves "R" and "Q" are generated at positions shifted by a frequency of fm with respect to the base frequency fo of the carrier wave "P". At this time point, the optical modulator 2 outputs outgoing light "B" where the carrier wave "P" of a frequency "fo" is subjected to intensity modulation with a frequency of fm.

These carrier waves and sideband wave are made incident to the receiver 7 as an arrow "B". The sensitivity of the common receiver 7 cannot follow the frequency "fo" of the carrier wave, so that the receiver 7 provides electrical signal only having a frequency of fm. The electrical signal is inputted into the system 8 for radiating radio signal, so as to radiate radio signal "C" of millimeter-wave having a frequency of, for example, fm.

In this case, contrary to a sub-carrier light source utilizing a mode locking laser system, many optical signals corresponding to vertical mode are not generated so that radio signal can be radiated at a high efficiency.

It is thus possible to change a filter to be set in the downstream of the receiver, required in Japanese Patent publication No. 2002-162465A, to a low cost filter not requiring severe band pass property. Further, only sideband waves are required and a filter can be alleviated. It becomes further possible to generate sideband waves efficiently for the radio signal. It is thus possible to radiate a radio signal having an output power larger than that of a sub-carrier light source, so that the necessity of a high performance optical amplifier or electric amplifier is alleviated even when the signal is divided into plural routes. As described above, the present invention is effective for cost reduction.

BRIEF DESCRIPTION OF THE DRAWINGS

FIG. 4 (b) is schematic diagram showing another property of an optical modulator when it is used as a frequency multiplier.

DETAILED DESCRIPTION OF THE INVENTION

Figure 1:
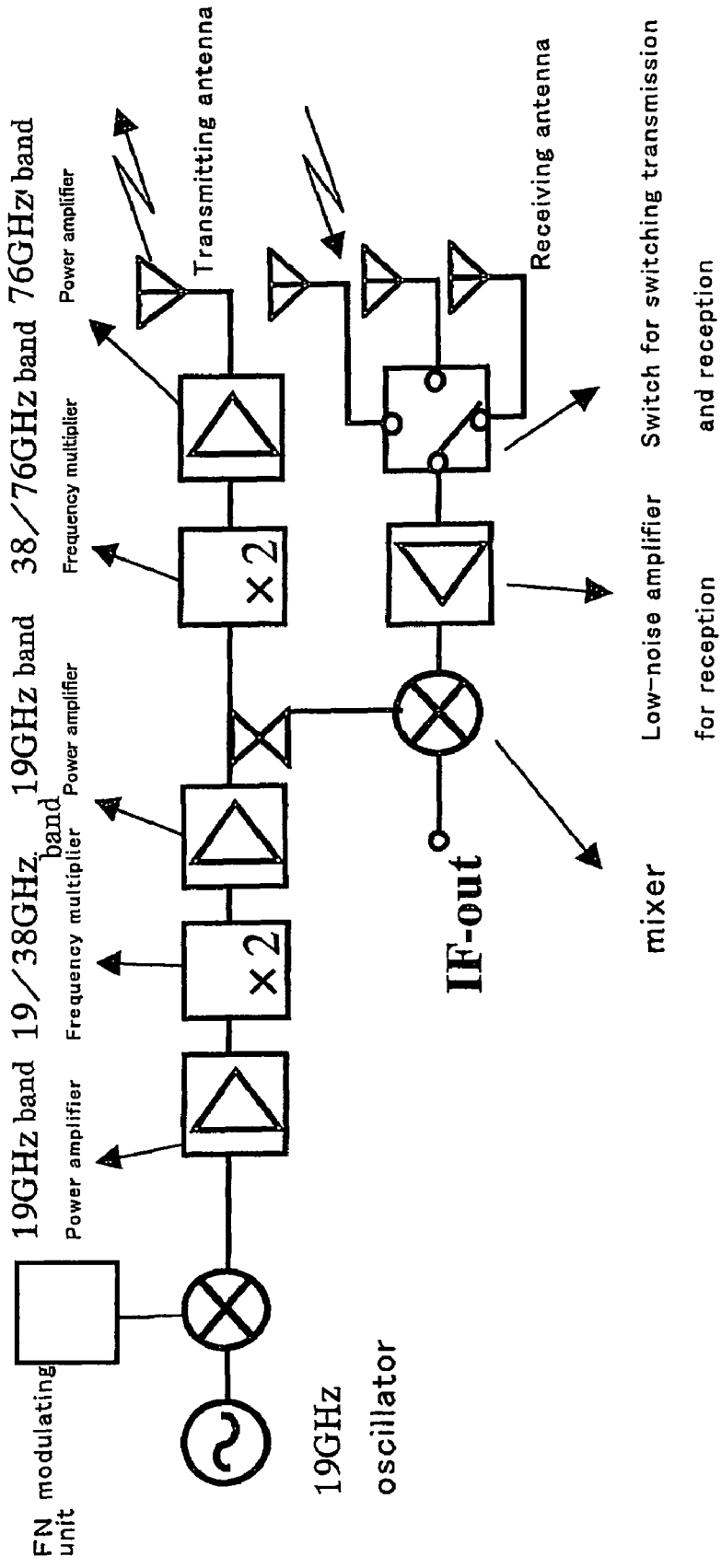
FIG. 1 is a block diagram showing an example of a radar system according to a prior art.
Figure 2:
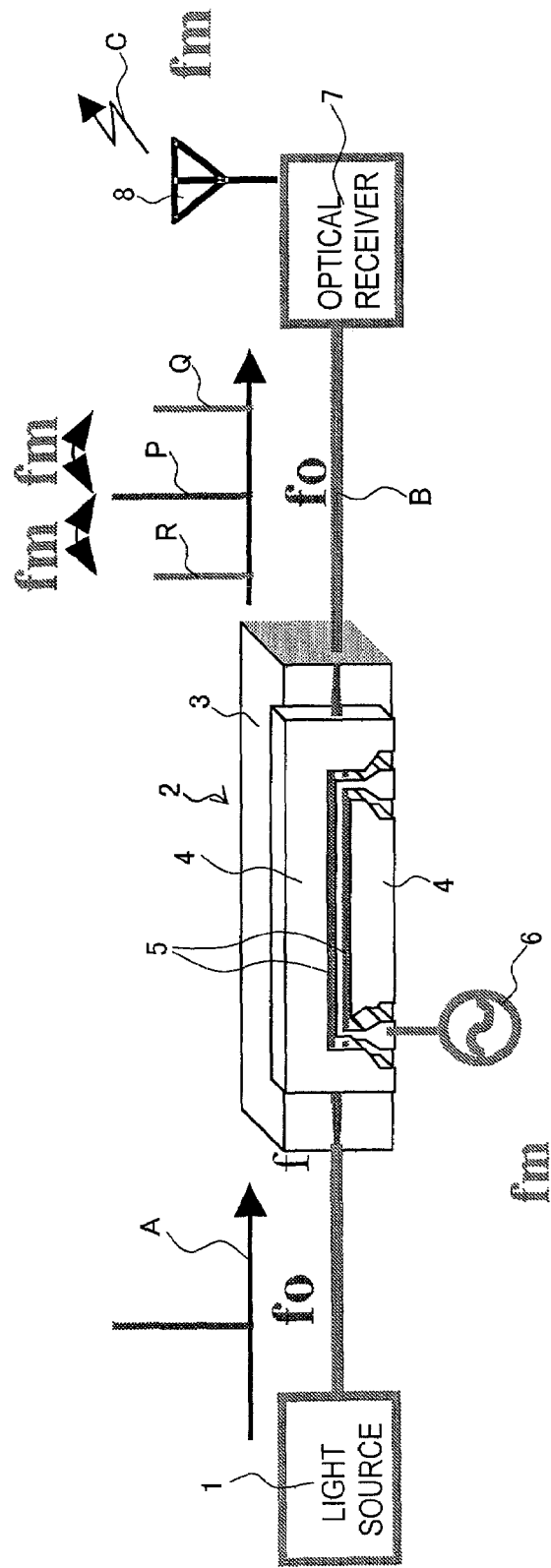
FIG. 2 is a block diagram showing a radio signal radiation system according to an example of the present invention.
Figure 3:
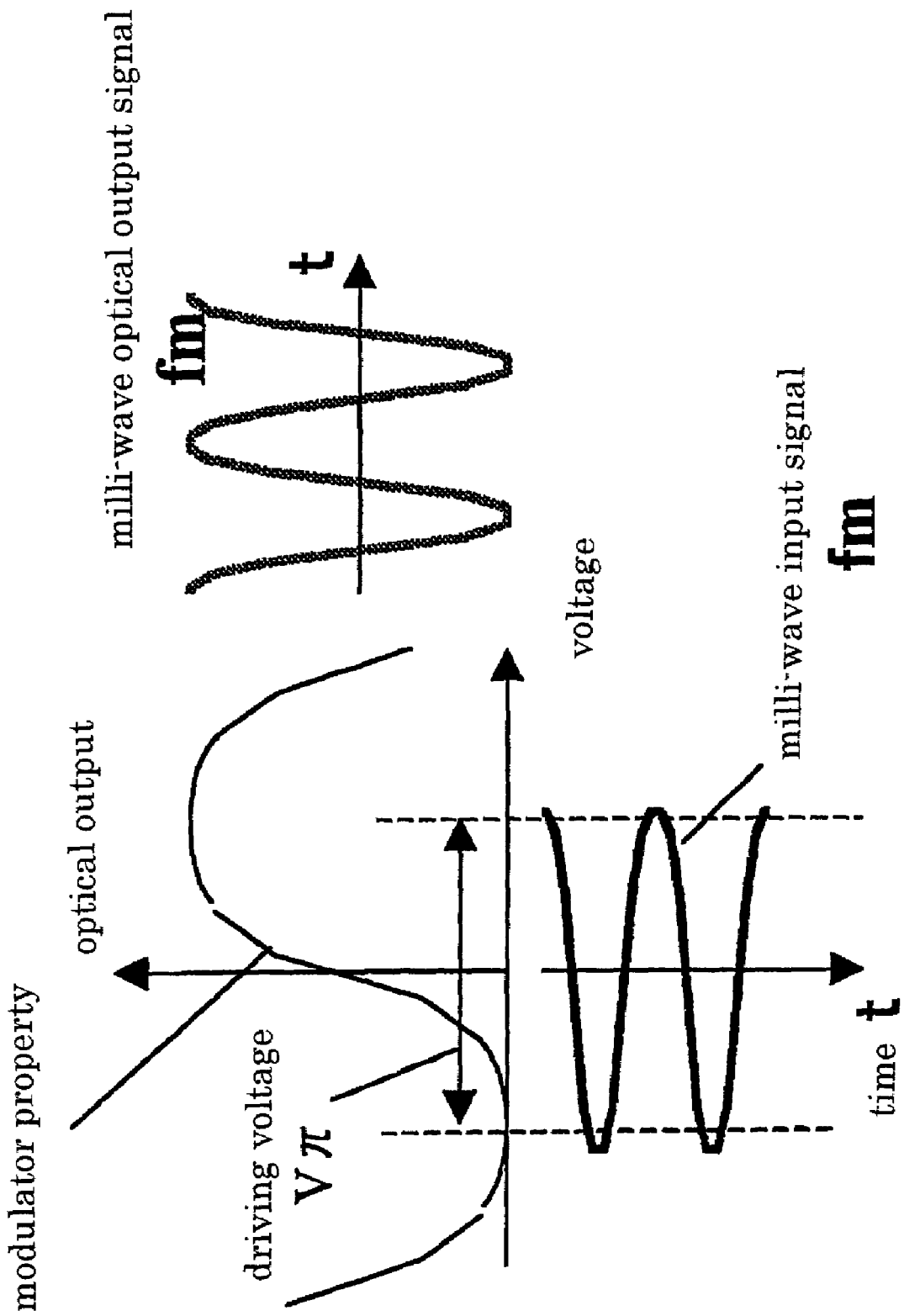
FIG. 3 is a schematic view for describing the properties of an optical modulator shown in FIG. 2.

According to a preferred embodiment, a modulating signal having a frequency of fm is inputted into an optical modulator to superimpose the sideband wave of a frequency of fm onto outgoing light, so that a radio signal of a frequency of fm is generated. For example, FIGS. 2 and 3 show examples corresponding with this embodiment.

Further, according to another embodiment, an optical modulator is used as a multiplier. That is, a modulating signal of a frequency of fm is inputted into the optical modulator and the amplitude of the modulating signal is made n times of the driving voltage $V\pi$ of the optical modulator ("n" represents an integer of 2 or more). The operational point is set at 0 or $\lambda/2$ of the optical modulator in the case that "n" represents an even number and set at $\lambda/4$ or $3\lambda/4$ of the optical modulator of the optical modulator in the case that "n" represents an odd number, so that a sideband wave is superimposed at positions shifted by a frequency of n×fm to radiate a radio signal of a frequency of n×fm. The multiplication number can be improved and radio signal of a high frequency can be generated using an oscillator of a low frequency, by elevating the driving voltage of the optical modulator.

Figure 4A:
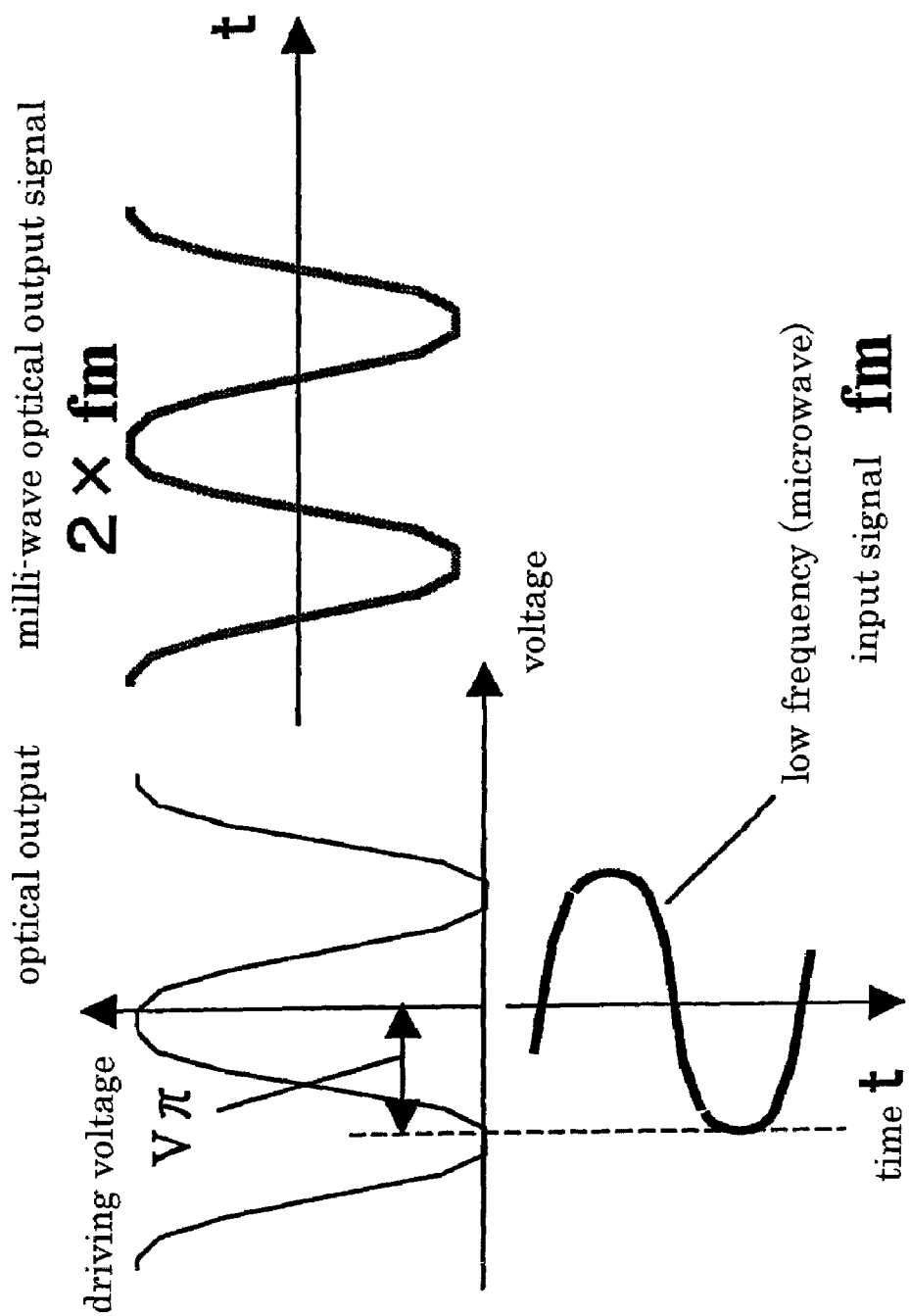
FIG. 4 (a) is a schematic view showing properties of an optical modulator when it is used as a frequency multiplier.
Figure 4B:
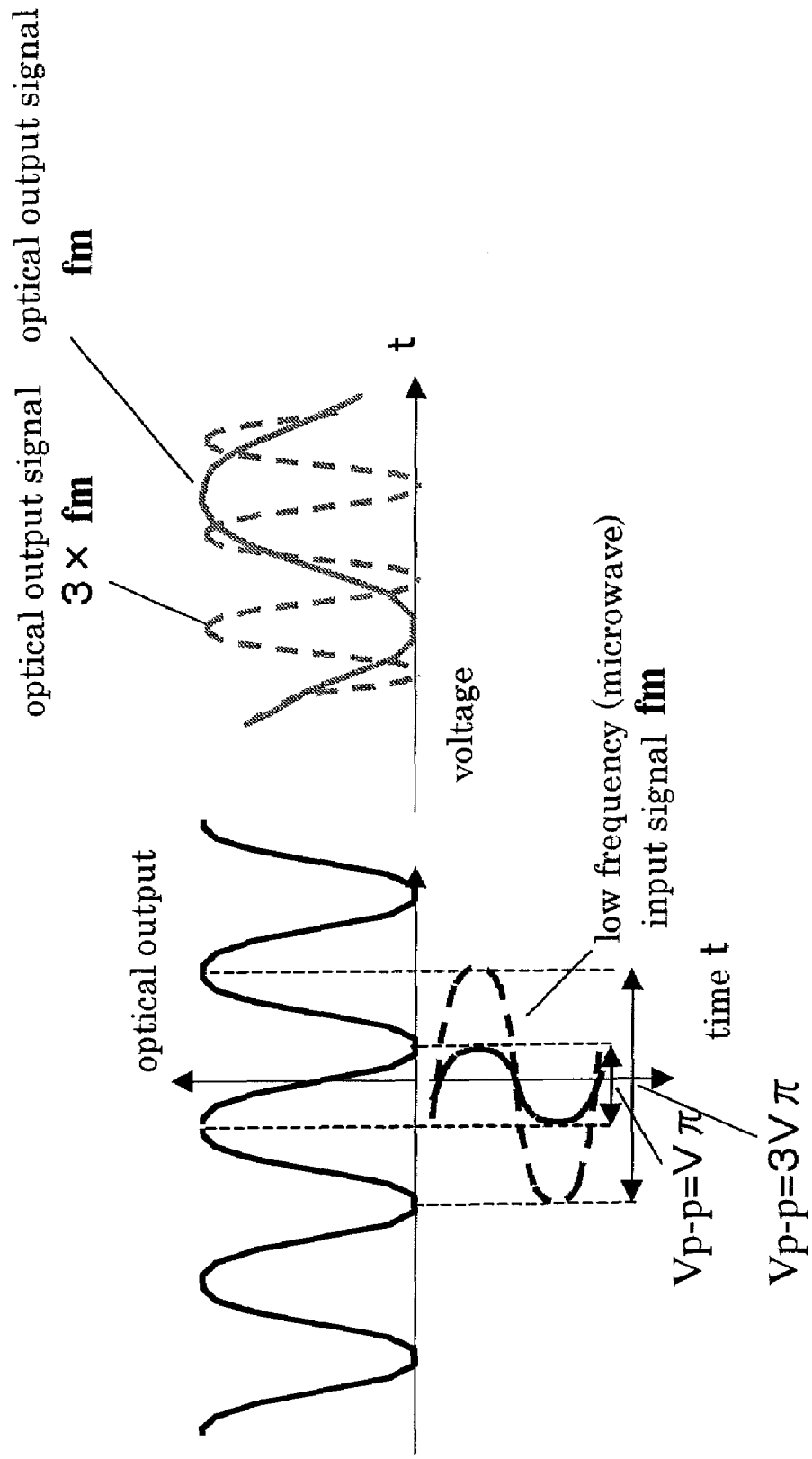

For example, as schematically shown in FIG. 4 (a), when the modulator is operated at a bias voltage at which the maximum peak position of optical output is provided (Vb: ON state) or when the modulator is operated at a bias voltage at which the optical output is zero (Vb: OFF state), a modulating signal of a frequency fm is inputted onto the optical modulator. The amplitude of the modulating signal is made twice as the driving voltage $V\pi$ of the optical modulator. A sideband wave of a frequency of 2fm is thus superimposed on the outgoing light. The outgoing light is then received by a light receiver having no sensitivity to the frequency "fo" of the carrier wave so that electrical signal of a frequency of 2fm can be obtained. The electrical signal is then inputted into a radiating means radiating radio signal, such as a transmitting antenna, to generate radio signal of a frequency of 2fm.

Further, as shown in FIG. 4 (b), when the modulator is operated at a bias voltage at which the optical output is ½ (Vb: π/2), a modulating signal of a frequency fm is inputted onto the optical modulator. The amplitude of the modulating signal is made k times of the driving voltage Vπ of the optical modulator ("k" is an odd number). The radio signal of a frequency of k×fm ("k" represents an odd number) can be generated using the outgoing light. Further, although FIG. 4 (b) shows the case that "k"=3, the same results apply in the case that "k" is 5 or more.

Further, according to the examples shown in FIGS. 2 and 3, the light of a frequency of fo corresponding with the carrier wave can be removed from the outgoing light with a filter. In this case, it is possible to obtain modulated outgoing light having a high extinction ratio irrespective of the driving voltage. It is thus generated an electrical signal of a beat frequency 2fm of sideband waves "Q" and "R" without a direct current component from a light receptor, so that a radio signal "C" of a frequency of 2 fm is radiated. In this case, the electrical signal contains no direct current component so that a radio signal having a low noise, such as thermal noise or the like, can be obtained.

Figure 5:
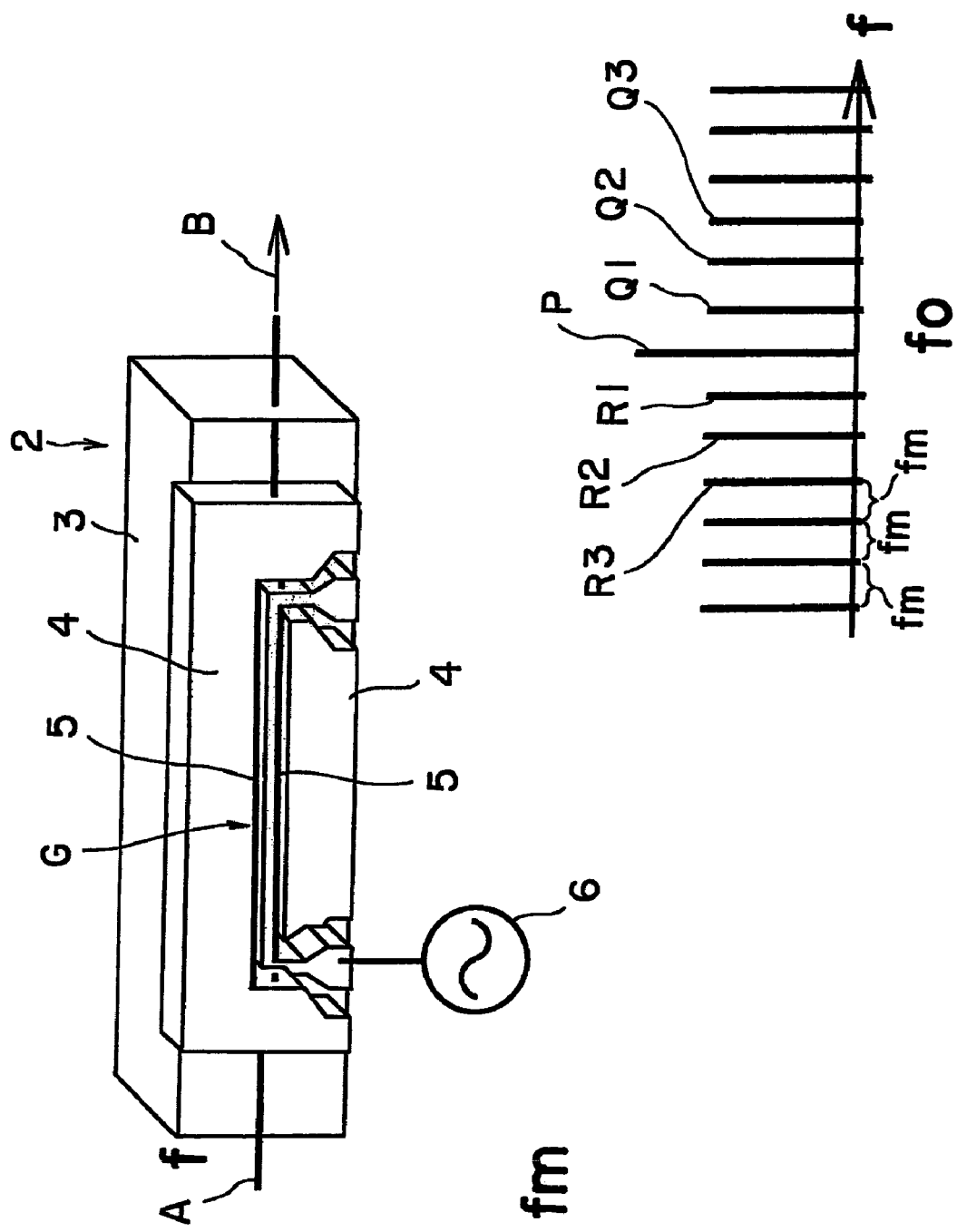
FIG. 5 is a schematic view describing the mechanism of generating radio signals of various frequencies from the optical modulator 2.

As shown in FIG. 5, it is provided that the frequency of a carrier wave "P" is fo and the frequency of the modulating signal is fm, it can be applied an appropriate modulating wave larger than Vπ on an intensity modulator or phase modulator, so that a plurality of sideband waves "Q1", "Q2", "Q3", "R1", "R2" and "R3" are radiated as arrows "B" on the plus and minus sides with respect to fo. In this case, a combination of sideband waves or carrier waves are selected corresponding to a target radio radiation frequency, and the other lights are cut by means of a frequency filter. Further, a plurality of modulators are connected in series or in parallel, or a difference of phases of sideband waves are adjusted by, for example, a length of an optical waveguide or an optical slow-wave circuit or microwave slow-wave circuit. It is thus possible to radiate a radio signal having a beat frequency of the remaining one set of sideband waves or the carrier waves.

Further, according to the present invention, a modulating signal of a frequency fm may be inputted into an optical modulator to superimpose a sideband wave onto an optical carrier wave at positions shifted at frequencies n×fm ("n" represents a desired integer of 1 or more), so that radio signal of a frequency of 2×n×fm can be selected and generated. In this case, radio signal generation is performed according to frequency multiplication system.

Specifically, it is provided that an intensity modulator is operated at a modulation frequency of fm, a voltage of Vp-p and a bias voltage of Vb. The optical field intensity is represented by the following formula to generate sideband waves. Each reference is represented as follows.

Jk(b): Bessel function

"$b$" $=\pi/4 \times (Vp\text{-}p/V\pi)$

When Vb=0: $a_1=1$, $a_2=0$
When Vb=Vπ: $a_1=0$, $a_2=1$ (Optical electric field)

光電界強度

$$E = a_1 \cdot E_o \cdot \sum_{k=0} (-1)^k J_{2k}(b) \cdot \cos(f_o \pm 2k \cdot f_m) +$$

-continued
$$a_2 \cdot E_o \cdot \sum_{k=1} (-1)^k J_{2k+1}(b) \cdot \cos[f_o \pm (2k+1) \cdot f_m]$$

Figure 15:
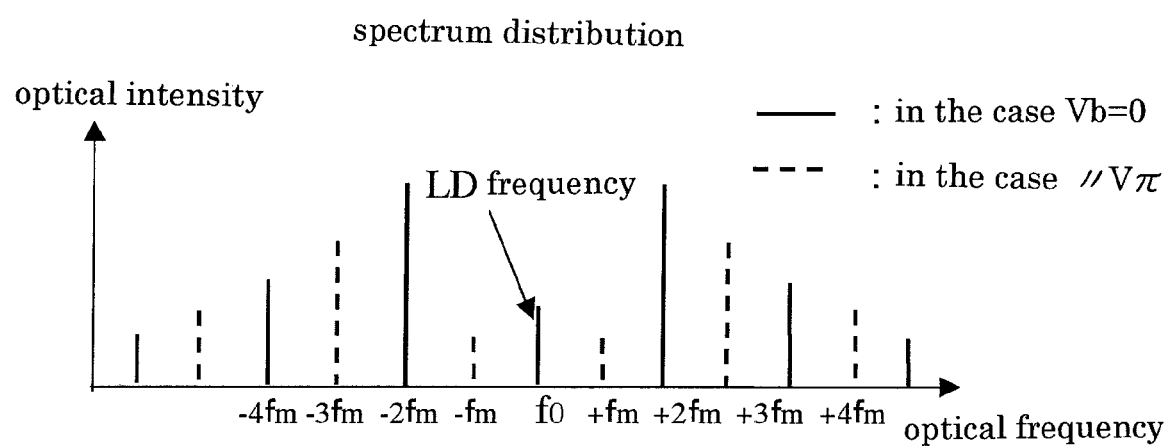
FIG. 15 is a diagram schematically showing spectrum distribution of n-th-order sideband wave.

FIG. 15 schematically shows spectrum distribution of each sideband wave. When the modulator is operated at a bias voltage where the optical output takes the maximum peak position (Vb: ON state), sideband wave of only even-order ("n" represents an even number) is radiated. On the contrary, when the modulator is operated at a bias voltage where the optical output is zero (Vb: OFF state), only sideband wave of odd-order ("n" represents an odd number) is generated. Each of the high-order (n-th-order) sideband wave components deviate depending on the driving voltage Vp-p and takes the maximum value at a specific driving voltage. It is thus possible to select the driving voltage at which a desired high-order (n-th-order) component is increased and the other n-th-order component is reduced, so that the desired n-th-order component can be outputted as a beat signal. It can be then converted opto-electrically to radiate a radio signal corresponding with a frequency of 2×n×fm.

In this case, the inhibition ratio of the optical intensity of the sideband wave corresponding with an integer other than a desired integer with respect to the optical intensity of the sideband wave corresponding with the desired integer may preferably be 10 dB or larger. Further, although the upper limit of "n" is not particularly limited, "n" may be 10 or smaller on the practical viewpoint.

Alternatively, in the case that the optical intensity of an undesired sideband wave is not inhibited with respect to the optical intensity of the desired sideband wave, the undesired sideband wave can be cut by means of an optical filter so that the inhibition ratio of the optical intensity of the undesired sideband wave with respect to the optical intensity of the desired sideband wave can be made 10 dB or less. Such optical filter includes a fiber Bragg grating (FBG) filter, a dielectric multi-layer filter, an array waveguide grating (AWG) filter, and etalon filter.

EXAMPLES

Results of calculation for each of harmonic waves will be described below.

(Second Harmonic Wave)

Figure 16:
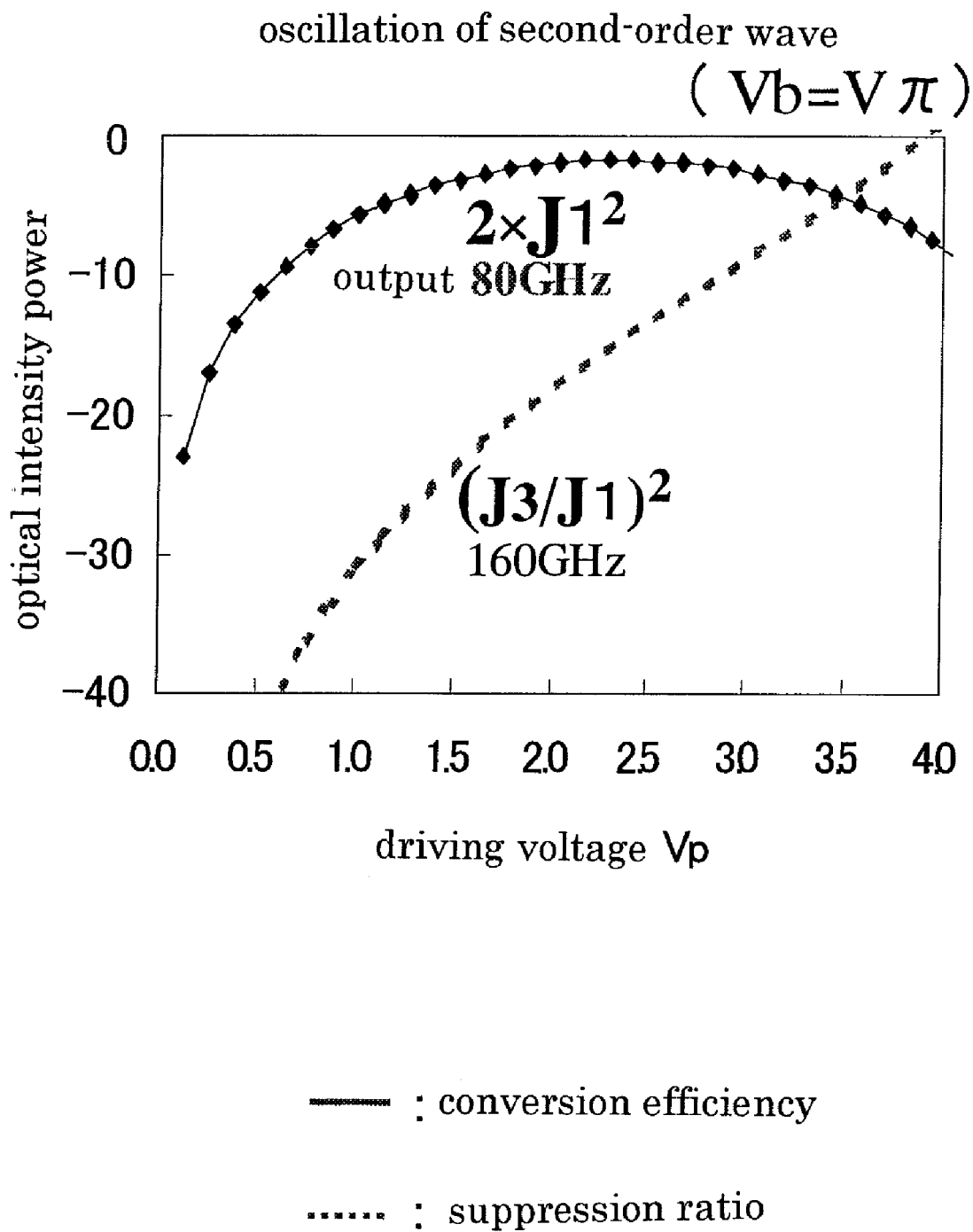
FIG. 16 is a graph showing the conversion efficiency and suppression ratio of sideband wave when second-order wave is radiated.

It is shown the calculated value of optical intensity of the n-th-order sideband wave in the case that the modulator is driven at a bias voltage Vb and an input voltage Vp-p. FIG. 16 shows the intensity of the first-order sideband wave $(J_1)^2$ and the ratio $(J_3/J_1)^2$ (inhibition ratio) of the intensity of the third-order sideband wave with respect to that of the first-order sideband wave, in the case that Vb is OFF state. The optical intensity of the first-order sideband wave takes the maximum value at an input voltage of $(2.3V\pi)Vp\text{-}p$, and the inhibition ratio of the third-order sideband wave becomes 15 dB or more. Therefore, in this case, it is obtained an optical beat signal (2×fm) of both first-order sideband waves as the optical output.

(Fourth Harmonic Wave)

Figure 17:
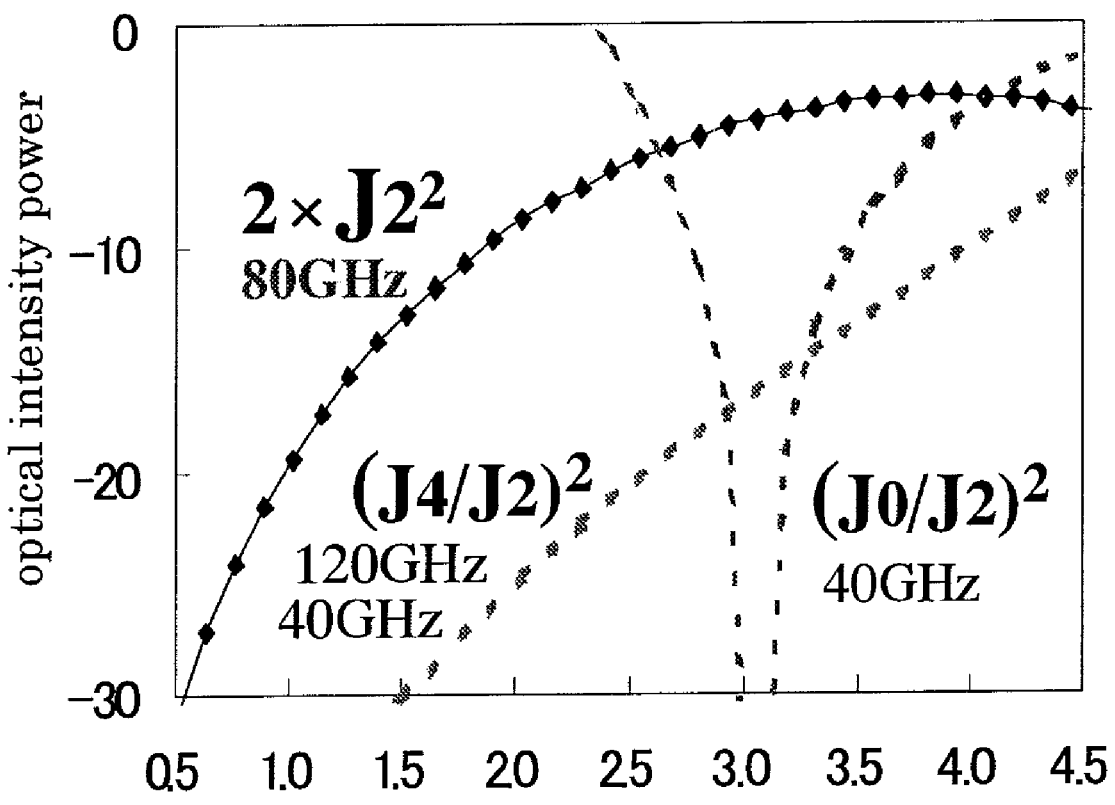
FIG. 17 is a graph showing the conversion efficiency and suppression ratio of sideband wave when fourth-order wave is radiated.

FIG. 17 shows the intensity $(J_2)^2$ of the second-order sideband wave, the inhibition ratio $(J_4/J_2)^2$ of the intensity of the fourth-order sideband wave with respect to that of the second-order sideband wave and the inhibition ratio $(J_0/J_2)^2$ of the intensity of the zero-order sideband wave with respect to that of the second-order sideband wave, in the case that Vb is ON state. The optical intensity of the second-order sideband wave takes the maximum value at an input voltage of $(3.95V\pi)Vp$-p. The inhibition ratio of the zero-order sideband wave to the second-order sideband wave is 30 dB or more and the inhibition ratio of the fourth-order sideband wave to the second-order sideband wave is 15 dB or more, at an input voltage of about $(3.1V\pi)Vp$-p. It is obtained an optical beat signal ($4\times fm$) of both second-order sideband waves as the optical output.

(Sixth Harmonic Wave)

Figure 18:
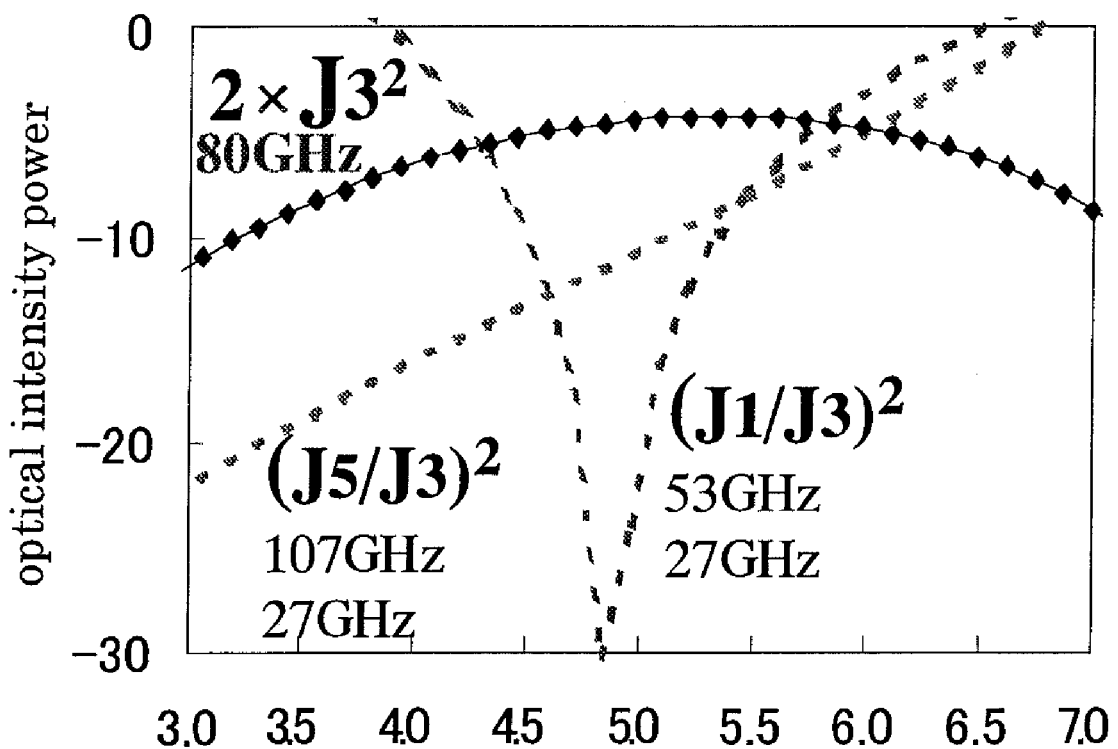
FIG. 18 is a graph showing the conversion efficiency and suppression ratio of sideband wave when sixth-order wave is radiated.

FIG. 18 shows the intensity $(J_3)^2$ of the third-order sideband wave, the inhibition ratio $(J_1/J_3)^2$ of the intensity of the first-order sideband wave with respect to that of the third-order sideband wave and the inhibition ratio $(J_5/J_3)^2$ of the intensity of the fifth-order sideband wave with respect to that of the third-order sideband wave, in the case that Vb is OFF state. The optical intensity of the third-order sideband wave takes the maximum value at an input voltage of $(5.35V\pi)Vp$-p. The inhibition ratio of the fifth-order sideband wave to that of the first-order sideband wave is 30 dB or more and the inhibition ratio of the first-order sideband wave to the third-order sideband wave is 11 dB around an input voltage of $(4.8V\pi)Vp$-p. In this case, an optical filter may be provided on the output side of the intensity modulator for cutting only the fifth-order sideband wave component, so as to further improve the inhibition ratio of the fifth-order sideband wave. It is thereby improve the inhibition ratio to 20 dB or more by means of the optical filter, and an optical beat signal ($6\times fm$) of both third-order sideband waves is obtained as the output of the optical filter.

When an FBG filter is used as the optical filter, the reflection wavelength of the FBG may be made the central wavelength of the sideband wave to be inhibited, the central wavelength of the fifth-order sideband wave in this case, so as to constitute a two-step filter. Therefore, the two-step FBG filter reflects the fifth-order sideband waves in the optical output signal from the intensity modulator, so that the optical output of the FBG filter provides the $6\times fm$ optical beat signal having a high inhibition ratio. A reflectivity of only about 10 to 20 dB is sufficient for the FBG filter for improving the inhibition ratio of unnecessary sideband wave to 20 dB or more, and this method can be performed at a low cost. Further, the elimination of the unnecessary sideband waves by an FBG filter is applicable to the cases where second or fourth harmonic waves are radiated, and is an effective means for obtaining an optical beat signal having a high inhibition ratio.

(Eighth Harmonic Wave)

Figure 19:
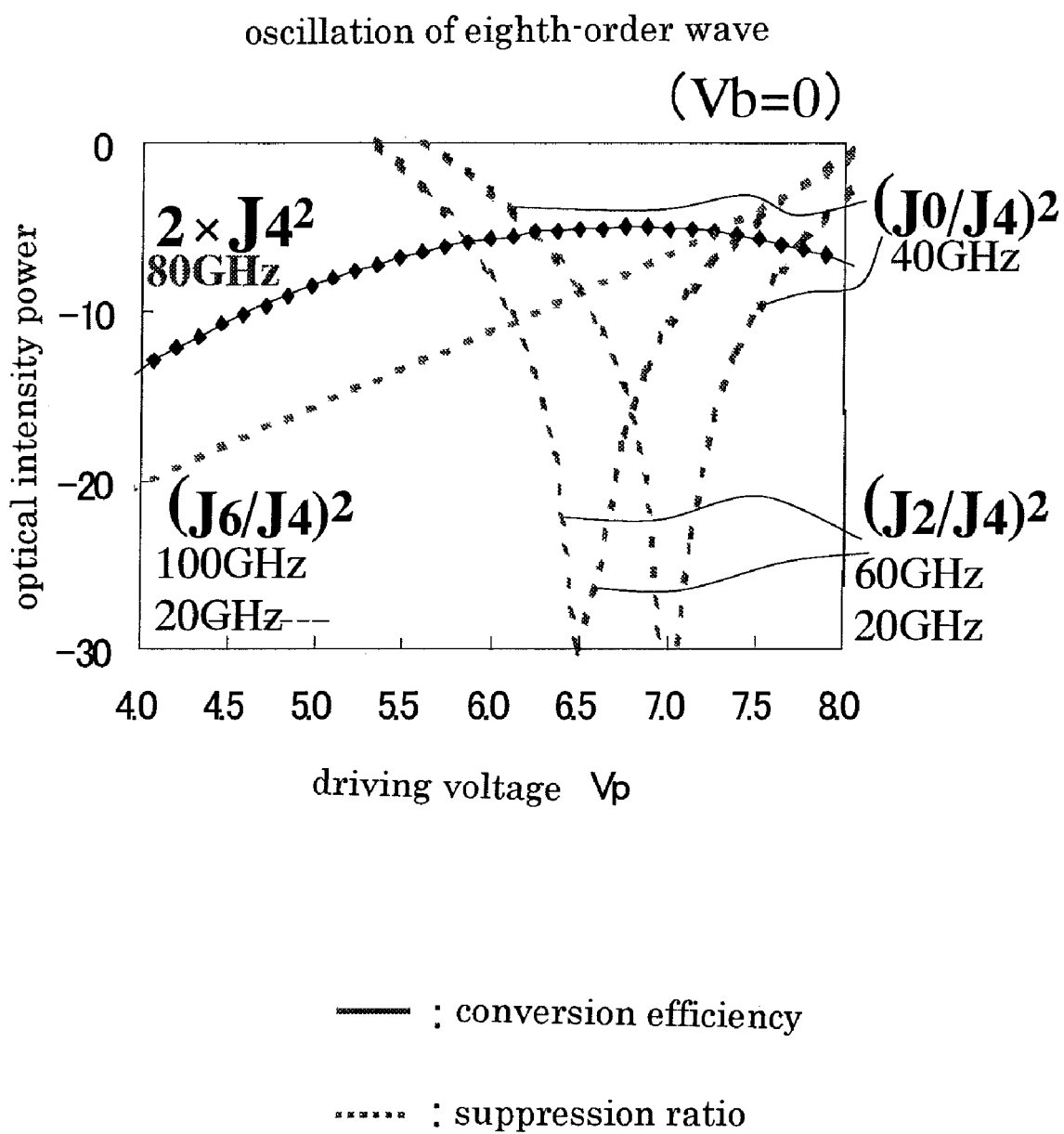
FIG. 19 is a graph showing the conversion efficiency and suppression ratio of sideband wave when eighth-order wave is radiated.

FIG. 19 shows the intensity $(J_4)^2$ of the fourth order sideband wave and the inhibition ratios $(J_0/J_4)^2$, $(J_2/J_4)^2$ and $(J^6/J_4)^2$ of the intensities of the optical carrier, second-order sideband wave and sixth-order sideband wave, respectively, with respect to that of the fourth-order sideband wave, in the case that Vb is ON state. The optical intensity of the fourth-order sideband wave takes the maximum value at an input voltage of $(6.75V\pi)Vp$-p. The inhibition ratio of the second-order sideband wave to the fourth-order sideband wave is 30 dB or more, the inhibition ratio of the optical carrier to the fourth-order sideband wave is 8 dB and the inhibition ratio of the sixth-order sideband wave to the fourth-order sideband wave is 9 dB, around an input voltage of $(6.5V\,7)Vp$-p. In this case, it may be used a three-step FBG filter having three central wavelengths corresponding with the optical carrier and both of the sixth sideband waves, so that each of the inhibition ratios can be improved to 20 dB or higher. It is thus possible to obtain an $8\times fm$ optical beat signal having a high inhibition ratio as the optical output signal from the intensity modulator by means of the FBG filter.

Further, in the case that the radio signal generation is performed according to frequency multiplication system, the modulator can be operated on an optional bias voltage and the bias voltage Vb is not necessarily ON state or OFF state, as shown in the formula (1). In this case, it can be obtained an optical beat signal of a high quality and a large S/N ratio by inhibiting sideband waves other than a desired sideband wave with an optical filter.

The radio signal radiation system according to the present invention may have one or a plurality of radiating mean(s) for radiating radio signal. In the latter case, outgoing light from the optical modulator for oscillation is divided into plural routes so that each divided light is inputted into the corresponding optical receiver. The attenuation of light due to the division and transmission is small, so that it is possible to reduce the cost in the case of providing a plurality of radio signal radiating means.

Figure 6:
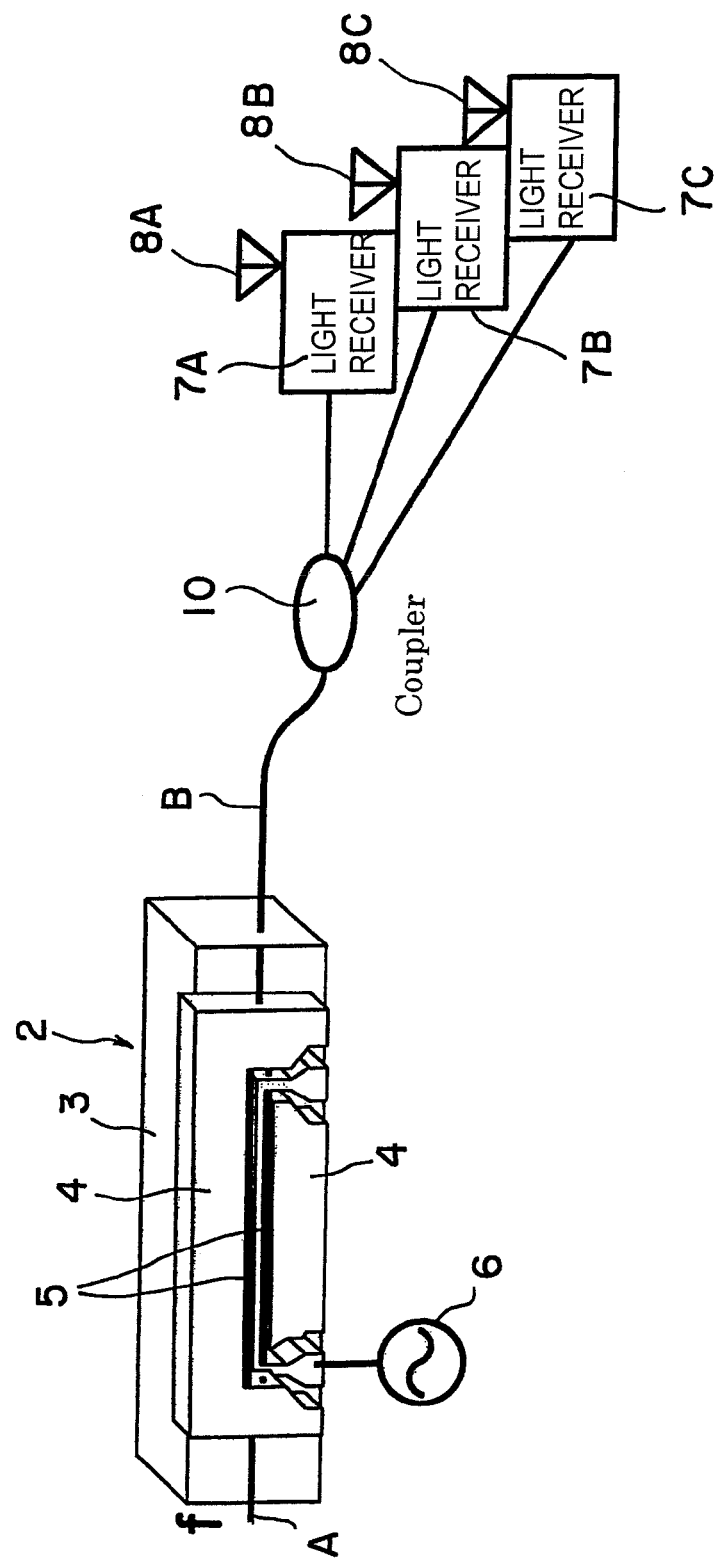
FIG. 6 is a diagram schematically showing an embodiment that outgoing beam "B" is divided into plural radio signal radiation means.

For example, as shown in FIG. 6, outgoing light "B" radiated from the optical modulator 2 is divided into plural routes by means of an optical coupler 10. Each divided light is then intercepted by a light receiver 7A, 7B or 7C to generate an electrical signal of a target frequency, so that the radio signal radiating means 8A, 8B and 8C radiate radio signals of the target frequency, respectively.

According to the present invention, the receiver is provided for receiving the radio signal reflected by an object, and the radio signal and received signal are processed to obtain information about the object. Specific construction and applications of the radar system are not limited. It is further possible to provide a plurality of the radio signal radiating means and radio signal receiving means.

Figure 7:
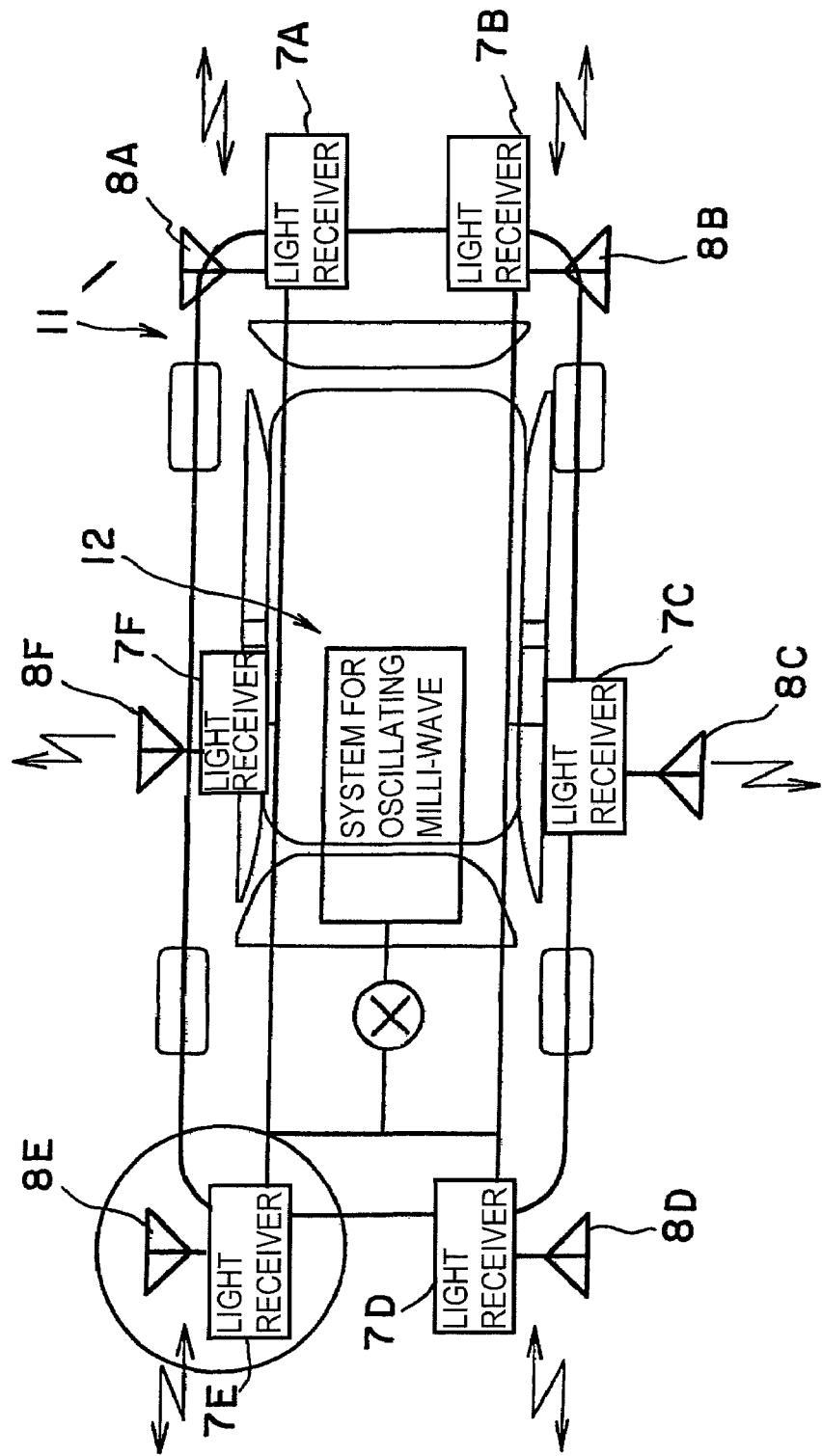
FIG. 7 is a schematic diagram showing an automobile equipped with plural radio signal radiation systems.

For example, according to an example shown in FIG. 7, a system 12 for oscillating millimeter-wave is ground at a specific position of an automobile 11. Light receivers 7A, 7B, 7C, 7D, 7E and 7F and radio signal oscillating systems 8A, 8B, 8C, 8D, 8E and 8F corresponding the respective receivers are equipped at predetermined positions of the automobile 11.

The inventive radar system will be described further in detail.

According to a preferred embodiment, it is provided an electrical dividing means for dividing the electrical signal outputted from the optical receiver and a mixer for mixing the divided signal from the electrical dividing means and the received signal.

Figure 8:
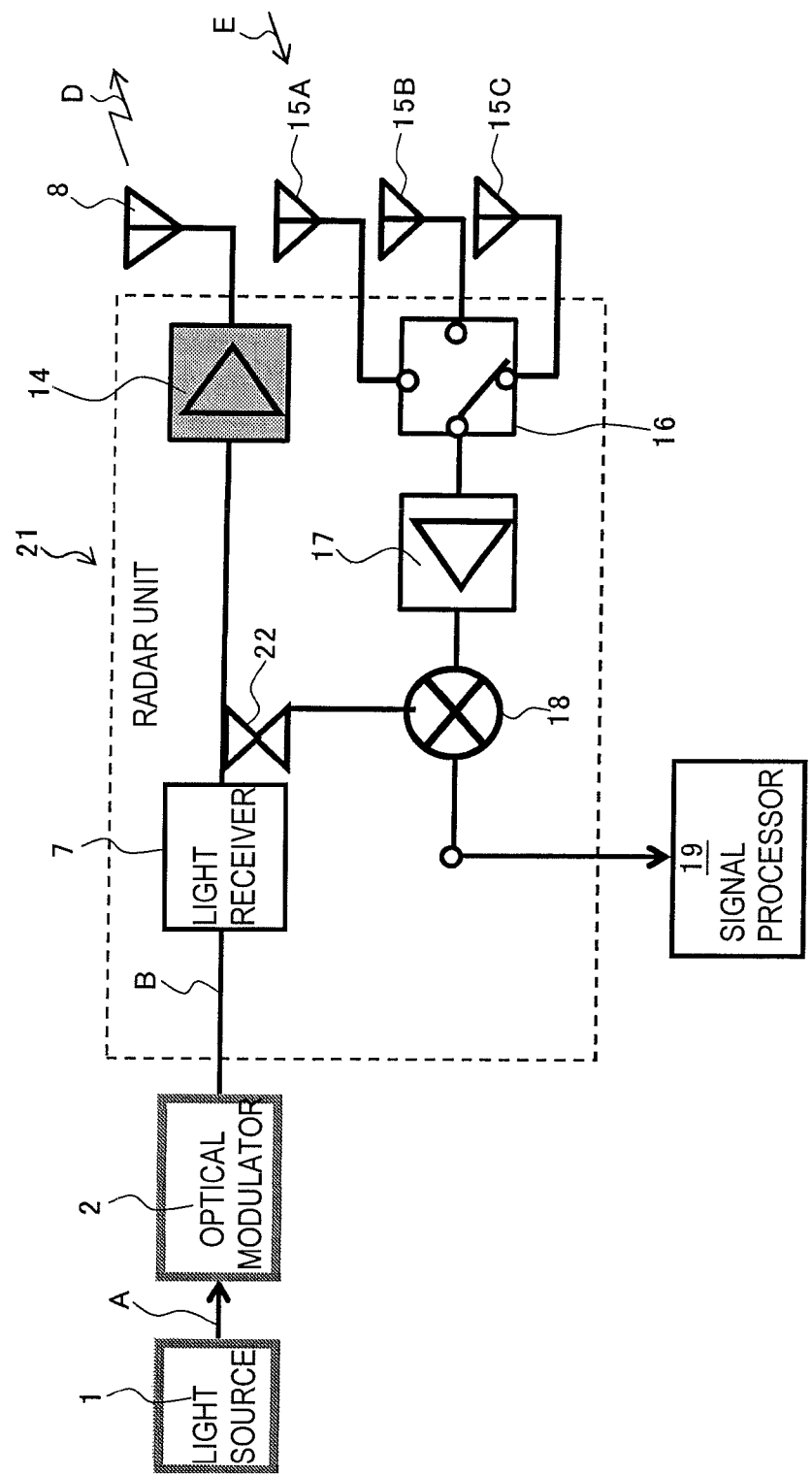
FIG. 8 is a block diagram schematically showing a radar system according to one embodiment of the present invention.

FIG. 8 is a block diagram showing a radar unit 21 according to this embodiment. Carrier wave "A" is irradiated from a light source 1 into the optical modulator 2, and the outgoing beam "B" described above is inputted into the optical receiver 7. The electrical signal of a target frequency that is output from the optical receiver 7 is divided into two routes by means of an electrical dividing means 22 (for example, power divider). One of the divided electrical signals is amplified by an electrical amplifier 14 so that radio signal is radiated as an arrow "D" with a radiating means 8.

The other of the divided electrical signals (having the target frequency) is transmitted to a mixer 18. On the other hand, light "E" reflected from an object is received by each of the light intercepting means 15A, 15B and 15C. The signal from each receiving means is selected by a switch 16 and amplified by an amplifier 17, and then mixed with the divided electrical signal by a mixer 18. The output is then processed in a predetermined signal processor 19 to obtain information about the position, velocity or the like of the object. Further, a filter may be positioned between the optical receiver 7 and the electrical dividing means 22 to cut signals of undesired frequencies.

Figure 9:
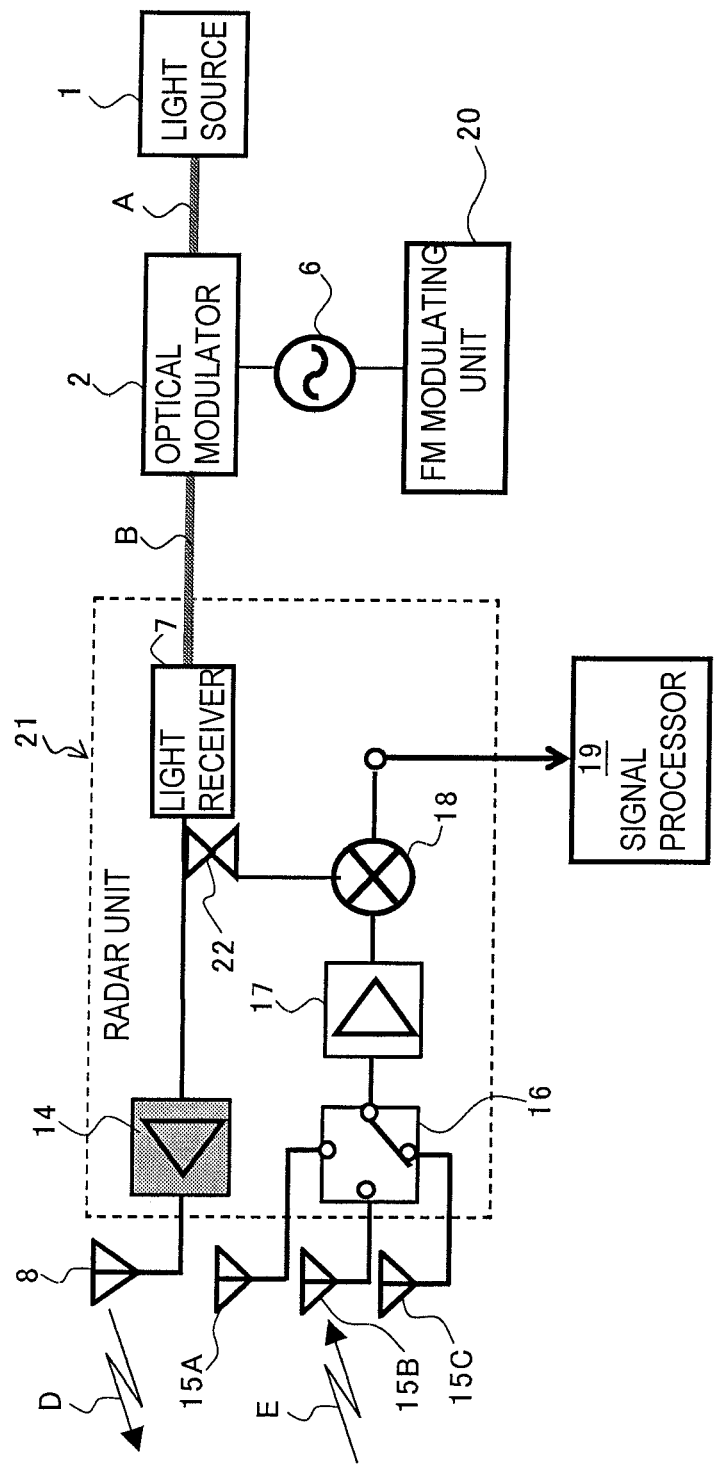
FIG. 9 is a block diagram schematically showing a radar system according to another embodiment of the present invention.

Also, according to an example of FIG. 9, the radar system shown in FIG. 8 is used. Modulating signal of a frequency fm is applied onto the optical modulator 2 by an energy source 6. Further, according to the present example, the signal from the source 6 is modulated with an FM modulating unit 20.

According to another embodiment, it is provided an optical dividing means for dividing outgoing light radiated from the optical modulator to perform the radiation of radio signal and reception of the received signal based on the outgoing light propagating through plural routes after the division.

Figure 10:
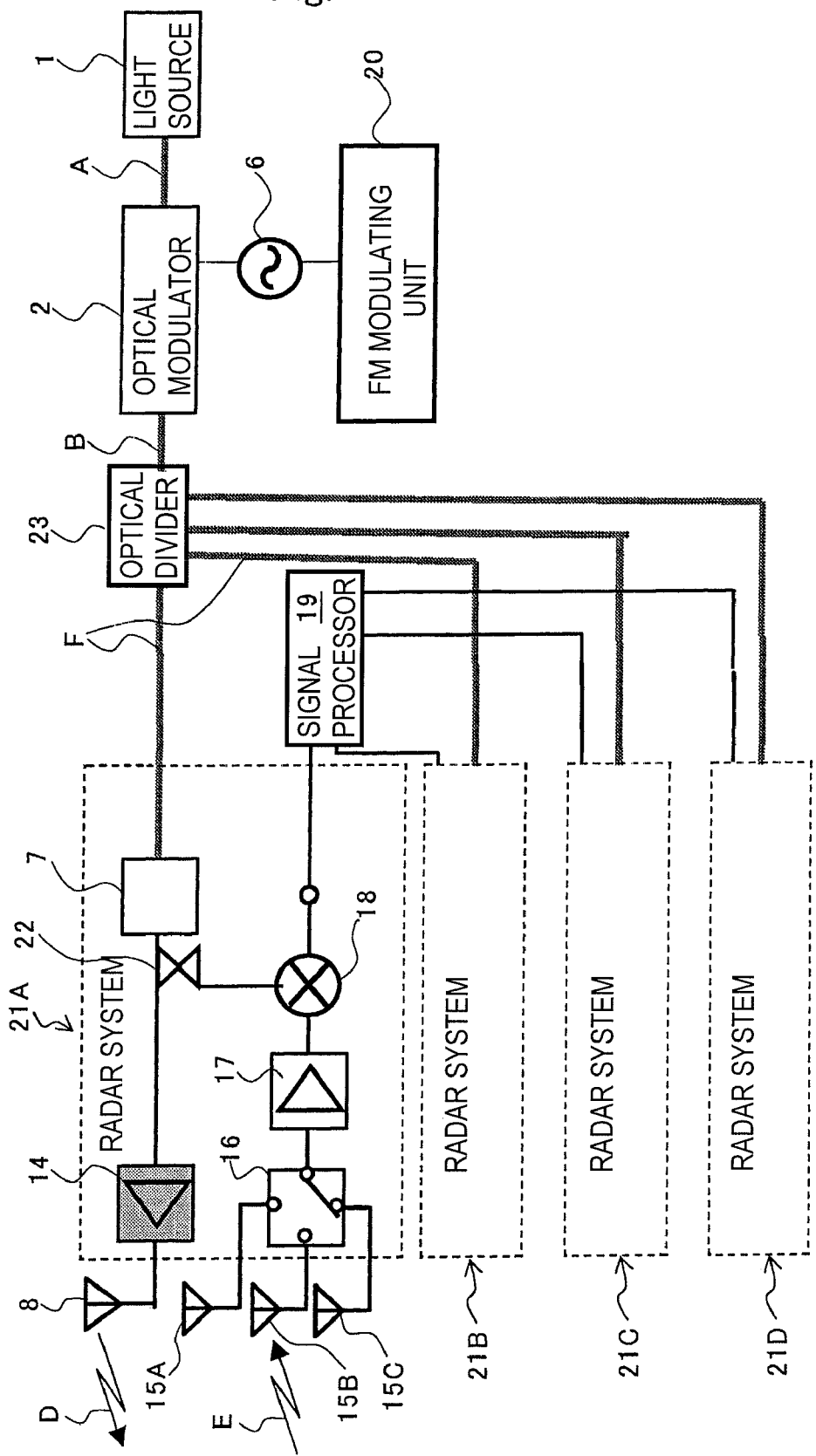
FIG. 10 is a block diagram schematically showing a radar system according to still another embodiment of the present invention, where the system has a plurality of radar units 21A, 21B, 21C and 21D.

FIG. 10 is a block diagram according to this embodiment.

The construction of each of the radar units 21A, 21B, 21C and 21D is substantially same as that of the radar unit 21 of FIG. 9 described above, and the explanation is omitted. According to the present example, outgoing light "B" from the optical modulator 2 is divided into plural routes, as arrows "F," with an optical dividing means 23 (such as optical coupler). The radar systems 21A, 21B, 21C and 21D are provided corresponding to the thus divided signals, respectively. Each of the radar systems performs the radiation and reception of the radio signal, which is then processed with a signal processor 19 to obtain information about the object.

Further, according to a preferred embodiment, the radar system has an optical dividing means for dividing outgoing light from the optical modulator, an additional optical modulator for receiving the outgoing light from the former modulator and for further modulating the outgoing light based on the received signal, and an additional light receiver for receiving the outgoing light from the additional optical modulator to convert it to an electrical signal.

Figure 11:
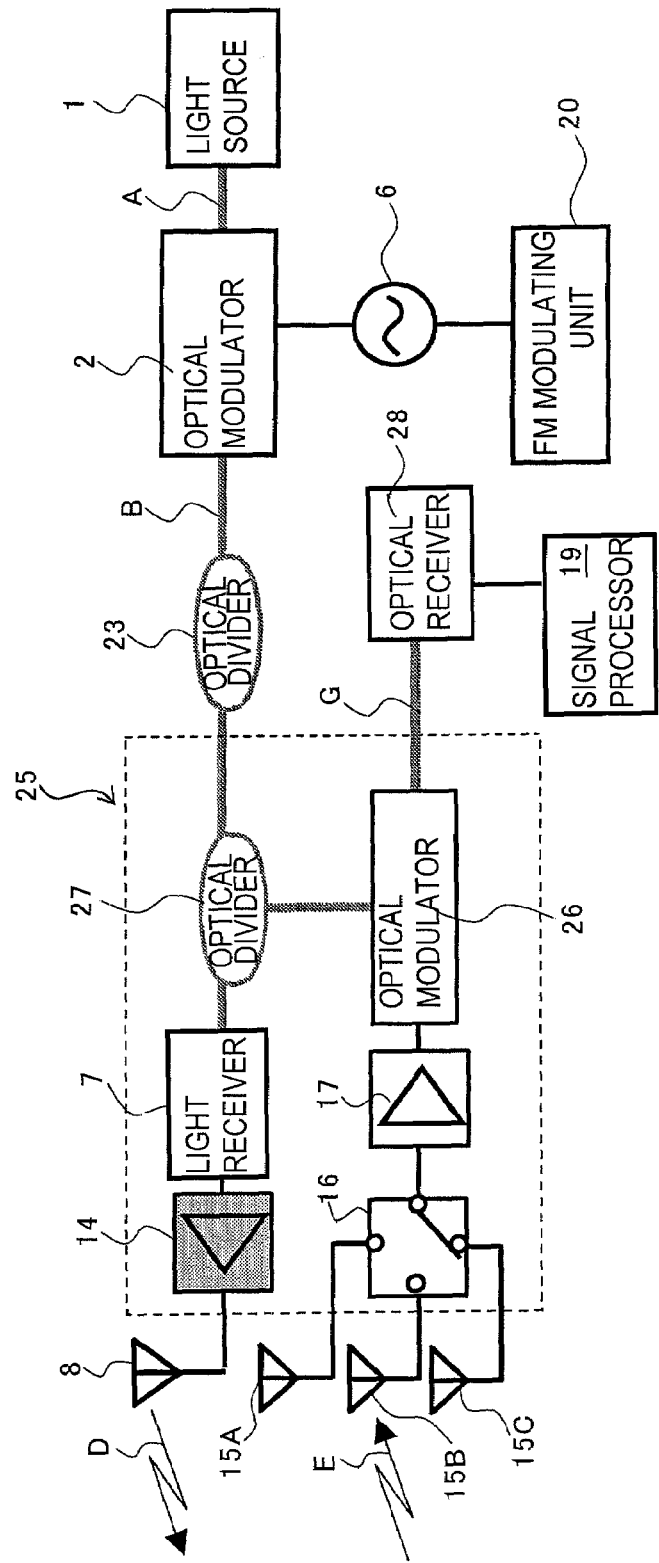
FIG. 11 is a block diagram schematically showing a radar system according to still another embodiment of the present invention.

FIG. 11 is a block diagram according to this embodiment.

Carrier wave "A" is radiated into the optical modulator 2 from the light source 1, and the above described outgoing beam "B" is made incident into the optical dividing means (for example, optical coupler) 23 and 27. One of the divided beams from the optical dividing means 27 is made incident into the optical receiver 7. The optical receiver 7 radiates electrical signal of a target frequency, which is then amplified with an electrical amplifier 14, so that the oscillating means 8 radiates radio signal as an arrow "D".

On the other hand, the other of the divided light (target frequency) is made incident into an optical modulator 26. Further, light "E" reflected from an object is received by each of receiving means 15A, 15B and 15C. Each signal from each receiving means is selected by a switch 16, amplified by an amplifier 17 and then used as a signal for controlling and modulating the optical modulator 26. The light modulator 26 radiates light "G", which is intercepted by an additional light receiver 28 to convert it to electrical signal. The electrical signal from the optical receiver 28 is processed by a signal processing unit 19 to obtain information about the object.

According to a preferred embodiment, it is provided an optical dividing means for dividing outgoing light from the optical modulator into plural routes, so as to perform the radiation of a radio signal and reception of the received signal based on the outgoing light propagating through the plural routes, respectively, after the division.

Figure 12:
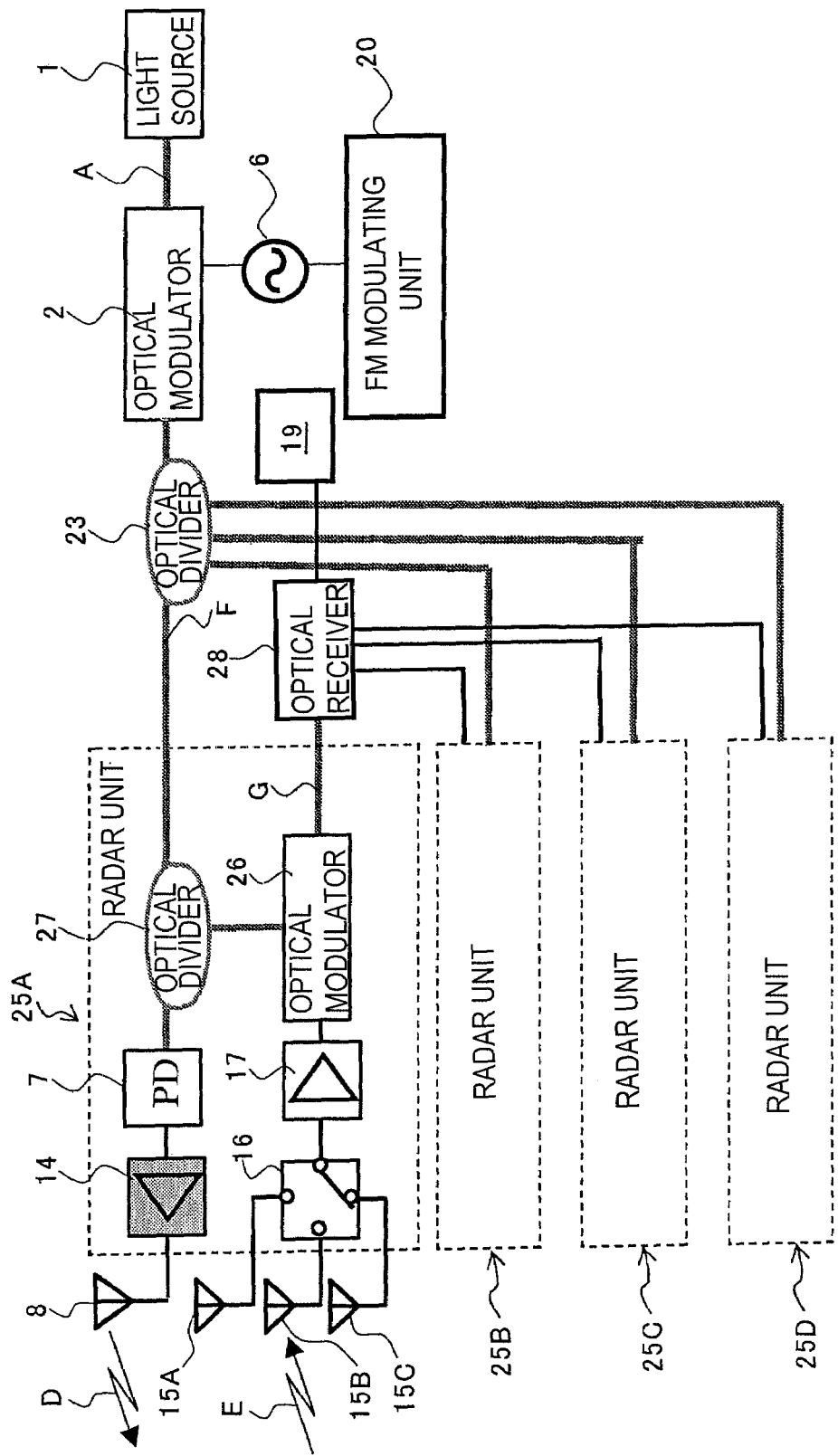
FIG. 12 is a block diagram schematically showing a radar system according to still another embodiment of the present invention, where the system has a plurality of radar units 25A, 25B, 25C and 25D.

FIG. 12 is a block diagram according to this embodiment.

The construction of each of the radar units 25A, 25B, 25C and 25D is substantially same as that of the radar unit 25 of FIG. 11 described above, and the explanation is omitted. According to the present example, outgoing light "B" radiated from the optical modulator 2 is divided into plural routes as arrows "F" with an optical dividing means 23 (such as optical coupler). The radar systems 25A, 25B, 25C and 25D are provided corresponding to the thus divided signals, respectively. Each of the radar systems performs the radiation and interception of the radio signal, which is then converted to electrical signal by the optical receiver 28 and processed with a signal processor 19 to obtain information about the object.

According to a preferred embodiment, the modulator is an intensity modulator or phase modulator. More preferably, the optical modulator has a substrate made of an electro-optic material, an optical waveguide provided on the substrate and traveling-wave type electrodes for applying a modulating voltage on the optical waveguide.

Such optical modulator includes an LN(lithium niobate)-MZ(Mach-Zehnder) type optical modulator, an electro-absorption type (EA) optical modulator, a semiconductor MZ type optical modulator, and an SSB type optical modulator. An LN-MZ type optical modulator is characterized in a low optical insertion loss compared with an EA optical modulator or semiconductor MZ type optical modulator. It may be thus possible to alleviate the necessity of an optical amplifier or an electrical amplifier in the case that light is divided into plural routes.

The inventors have developed optical modulators comprising a thin plate of X-cut lithium niobate single crystal and having a wide bandwidth and low driving voltage for use in optical communication. In the case that the optical modulator is used for radio signal radiation, the application bandwidth is limited within several GHz, so that it is sufficient to satisfy desired optical modulating property only within such narrow bandwidth. In the application of radio signal radiation, the application bandwidth is narrow. It is thus easy to adjust the output impedance of an oscillator required for driving and modulation to the input impedance of electrodes of an optical modulator in the narrow application bandwidth. $V\pi$ can be further lowered and the multiplication factor can be further improved.

On the viewpoint, the gap width of electrodes in the traveling wave type electrodes may preferably be 20 μm or smaller.

The specific construction of the optical modulator is not particularly limited and includes those described in Japanese patent publications H10-082921A, 2001-066561A, 2002-169133A, 2001-101729A, 9-211402A and 2001-235714A.

Figure 13:
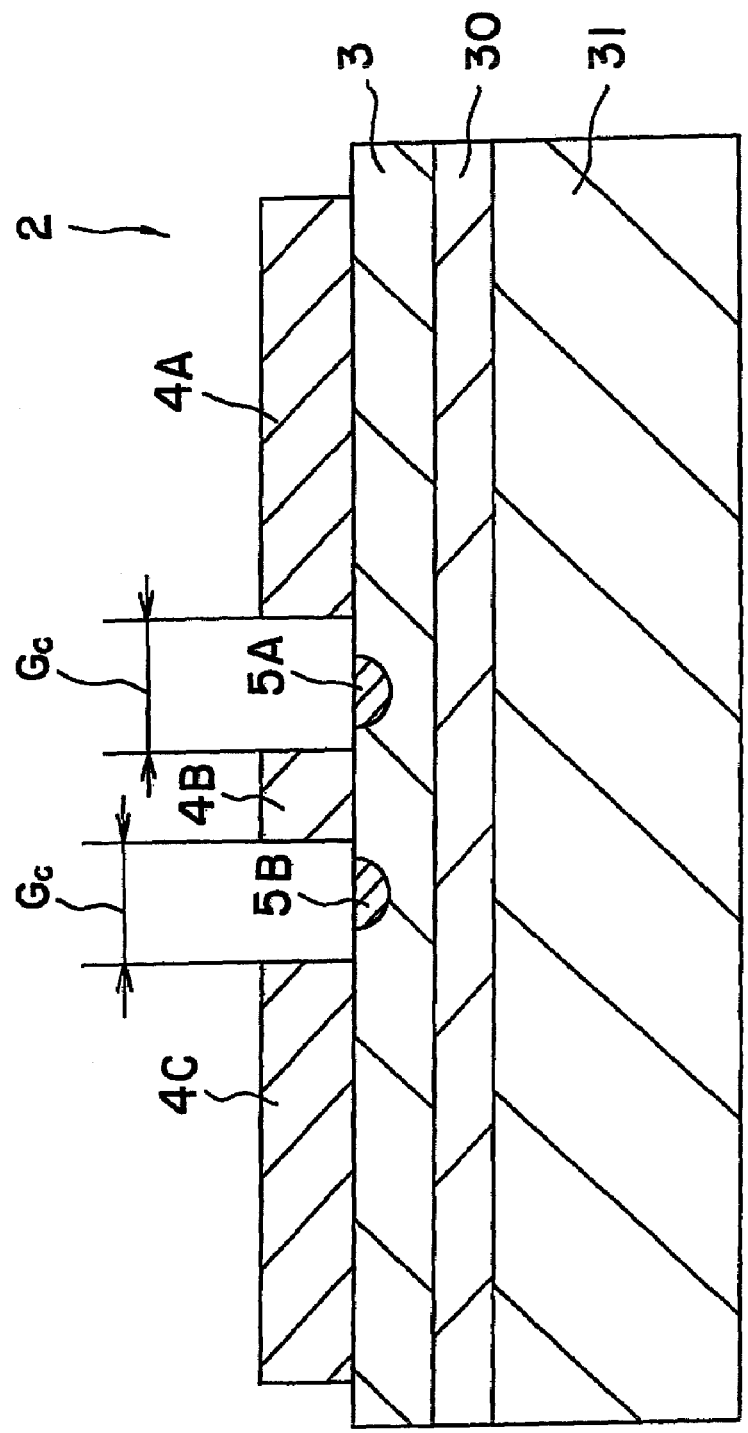
FIG. 13 is a schematic view showing an example of an optical modulator 2.

FIG. 13 is a cross sectional view showing an example of an optical modulator.

An optical modulator 2 has an optical waveguide substrate 3 and a supporting body 31. The substrate 3 and supporting body 31 are both plate shaped. The thickness of the substrate 3 is preferably 100 μm or smaller and more preferably be 30 μm or smaller. Predetermined electrodes 4A, 4B and 4C are formed on one main face 4a of the substrate 3. Although so-called coplanar waveguide type (CPW) electrode configuration is applied according to the present example, the configuration of electrodes is not particularly limited. For example, ACPS type electrode configuration can be used. Traveling wave type modulator of so-called independent-modulation type can be further applied.

According to the present example, a pair of optical waveguides 5A and 5B are formed between the adjacent electrodes, so that a signal voltage can be applied onto each of the waveguides 5A and 5B in a direction substantially parallel with the main face. The optical waveguide is of so-called Mach-Zehnder type structure in a plan view. Such Mach-Zehnder type pattern itself is well known. An adhesive layer 30 having a substantially constant thickness is provided between the lower face of the substrate 3 and the supporting body 31 to adhere the substrate 3 and supporting body 31.

The optical waveguide may be a ridge type optical waveguide directly formed on the one main face of the substrate, or a ridge type optical waveguide formed on another layer on the one main face of the substrate. Alternatively, the optical waveguide may be an optical waveguide formed by inner diffusion process such as titanium diffusion process, or an optical waveguide produced by ion exchange process such as proton exchange. Specifically, the optical waveguide may be a ridge type optical waveguide protruding from the surface of the substrate. The ridge type optical waveguide may be formed by laser or mechanical processing. Alternatively, a high refractive index film is formed on the substrate and processed with a machine or laser ablation to form a ridge type three-dimensional optical waveguide. The high refractive index film may be formed by, for example, chemical vapor deposition, physical vapor deposition, organic metal chemical vapor deposition, sputtering or liquid phase epitaxial method.

The electrode is formed on the surface of the substrate. That is, the electrode may be directly formed on the surface of the substrate, or may be formed on a buffer layer or a low dielectric layer formed on the surface of the substrate. The low dielectric layer may be made of any known materials such as silicon dioxide, magnesium fluoride, silicon nitride and alumina. The low dielectric layer means a layer made of a material having a dielectric constant lower than that forming the substrate.

The thickness of the adhesive layer 30 may preferably be 1000 μm or smaller and more preferably be 300 μm or smaller and most preferably be 100 μm or smaller. Further, although the lower limit of the thickness of the adhesive layer 30 is not particularly defined, the thickness may preferably be 10 μm or larger, on the viewpoint of lowering the effective refractive index of microwave.

The optical waveguide substrate 3 and supporting body 31 are made of an electro-optic material having ferroelectricity and may preferably be made of a single crystal. Such crystal is not particularly limited as far as it is effective for light modulation, and includes lithium niobate, lithium tantalate, lithium niobate-lithium tantalate solid solution, potassium lithium niobate, KTP, GaAs and quartz.

The material of the supporting body 31 includes a glass such as quartz glass, in addition to the above described materials.

Although the adhesive is not particularly limited as fas as the adhesive satisfies the above conditions, the adhesive includes an epoxy adhesive, a thermal setting type adhesive, an ultraviolet curable adhesive, and "ALON CERAMICS C" (manufactured by To a Gosei Co., Ltd.: a thermal expansion coefficient of $13 \times 10^{-6}$/K) having a thermal expansion coefficient near that of the electro-optic material such as lithium niobate.

A sheet made of an adhesive is interposed between the back face of the substrate and the supporting body to join them. Preferably, a sheet made of an adhesive of a thermosetting resin, photoresist resin or light thickening resin is interposed between the back face of the main body and the supporting body and then cured.

Examples

Example 1

The radar system was produced using an optical modulator 2 shown in FIG. 13.

Specifically, Ti-diffusion waveguides 5A, 5B and CPW electrodes 4A, 4B and 4C were formed on a substrate of x-cut lithium niobate 3. As to the electrode structure, the gaps "G" between the central electrode 4B and ground electrodes 4A, 4C were 20 μm, the electrode thickness was 20 μm, and the electrode length was 40 mm. The modulator substrate was adhered, for thinning, to a dummy plate fixed onto a surface plate with a thermoplastic resin, so that the electrode face is oriented downwardly. The substrate was then subjected to horizontal polishing and polishing to a thickness of 6 μm. A plate-shaped reinforcing body of x-cut lithium niobate was then adhered to the modulator substrate. The body was subjected to polishing at the end face to be connected to an optical fiber and cut into chips by dicing. An adhesive having a specific dielectric constant of 4 was used as the adhesive for the fixation and adhesion and the thickness of the adhesive layer 30 was made 50 μm. The modulator chip was adhered and fixed to an optical fiber with an UV curable resin after the adjustment of light axes. After the chip was mounted, the properties were evaluated to prove that $V\pi$ was 1.5 V. Further, the 3 dB bandwidth was 20 GHz based on the optical response.

The optical modulator 2 was used to produce the radar system shown in FIGS. 2, 3 and 9. A frequency band of 76 GHz was used and a DFB laser system of 1.55 μm was used as a light source. The optical modulator 2 was operated at the operational point that the power of the outgoing light takes the maximum, that is, at an oscillating frequency of 7.6 GHz and an input voltage of ±7.5V. The wavelength of the modulated light was observed by an optical spectrum analyzer and the sideband wave was observed at a position shifted by 76 GHz with respect to the base band of 1.55 μm The outgoing light "B" was made incident into a light receptor 7 and converted to an electrical signal, which was amplified to radiate a radio signal "D" from the antenna 8. As a result, it was proved that the radio signal "D" of a frequency of 76 GHz was oscillated.

Example 2

Then, a delta wave of the above radiation frequency was modulated to operate the optical modulator 2 according to the same method. It was thus proved that FMCW signal of a central frequency of 76 GHz was radiated. The signal was irradiated to a moving object from the transmitting antenna 8, and the reflected signal was received with the receiving antennas 15A, 15B and 15C.

Figure 14:
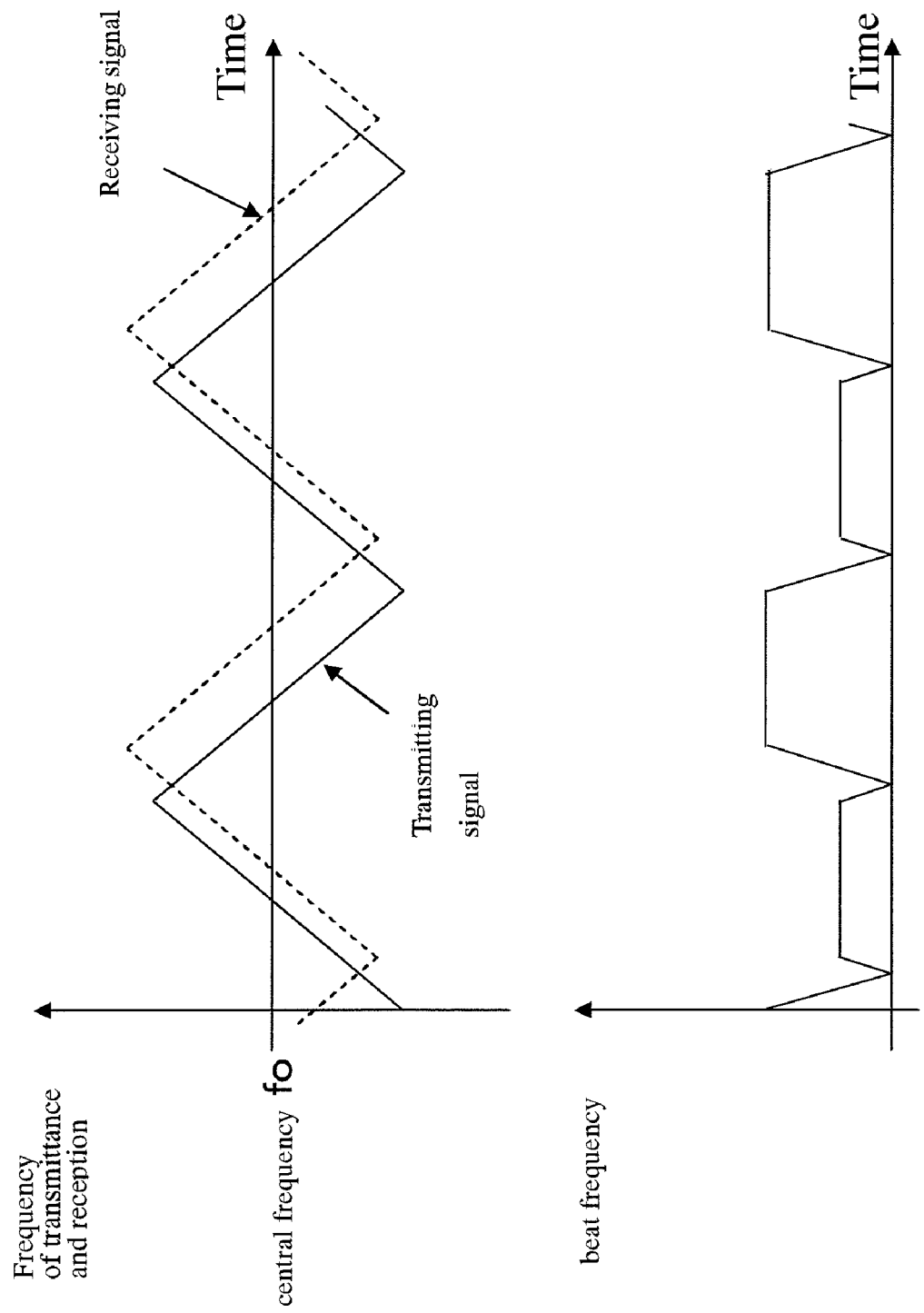
FIG. 14 is an example of a transmitted signal according to FMCW signal and signal reflected from a moving object.

The transmitted signal and received signals were mixed by the mixer 18 to draw the beat signal shown in FIG. 14, so that the distances and relative velocities could be detected. It was confirmed that the actual distance of 100 m and actual velocity of 50 km of the moving object were measured.

Example 3

Radio signal radiation was performed according to the same procedure as the example 1. According to the present example, however, Ti-diffusion waveguides 5A, 5B and CPW electrodes 4A, 4B and 4C were formed on a substrate 3 of x-cut lithium niobate. The width of the central electrode 4B was made 50 μm. The gaps G of the central electrode 4B and the ground electrodes 4A and 4C, respectively, were made 15 μm, the electrode thickness was made 15 μm and the electrode length was made 40 mm.

The modulator substrate was adhered to a dummy plate fixed onto a surface plate with a thermoplastic resin for the thinning, so that the electrode face is oriented downwardly. The substrate was then subjected to horizontal polishing and polishing to a thickness of 6 μm. A plate-shaped reinforcing body of x-cut lithium niobate was adhered and fixed to the modulator substrate. The body was subjected to polishing at the end face to be connected to an optical fiber and cut into chips by dicing. An adhesive having a specific dielectric constant of 4 was used as the adhesive for the fixation and the thickness of the adhesive layer 30 was made 50 μm. The modulator chip was adhered and fixed to an optical fiber with an UV curable resin after the adjustment of light axes. After the chip was mounted, the properties were evaluated to prove that $V\pi$ was 1.2 V. Further, the 3 dB bandwidth was 20 GHz based on the optical response.

Figure 20:
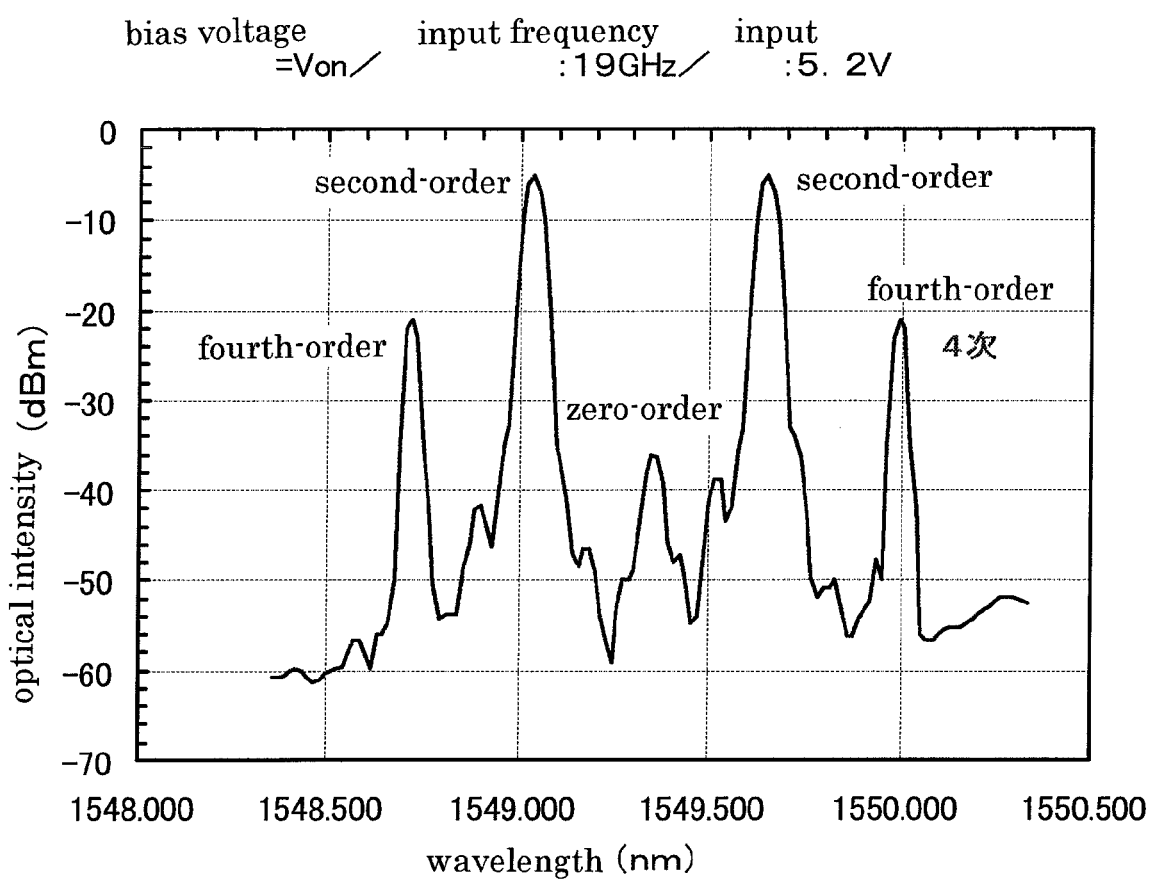
FIG. 20 is a graph showing distribution of wavelength-optical intensity of sideband wave according to an example 3.

A frequency band of radar of 76 GHz was used and a DFB laser system of 1.55 μm was used as a light source. The modulator was operated at the operational point that the power of the outgoing beam takes the maximum (Vb: ON state), at a frequency of 19 GHz. $V\pi$ at the frequency was 1.7 V. The input voltage was made 5.2 V, and the spectral wave form of the modulated light was observed by an optical spectrum analyzer, to prove that it was obtained optical spectrum shown in FIG. 20. The inhibition ratio of the optical carrier with respect to the second-order sideband wave was 30 dB, the inhibition ratio of the fourth-order sideband wave with respect to the second order sideband wave was 15 dB and the frequency between the sideband waves was proved to be 76 GHz (4×fm).

Figure 21:
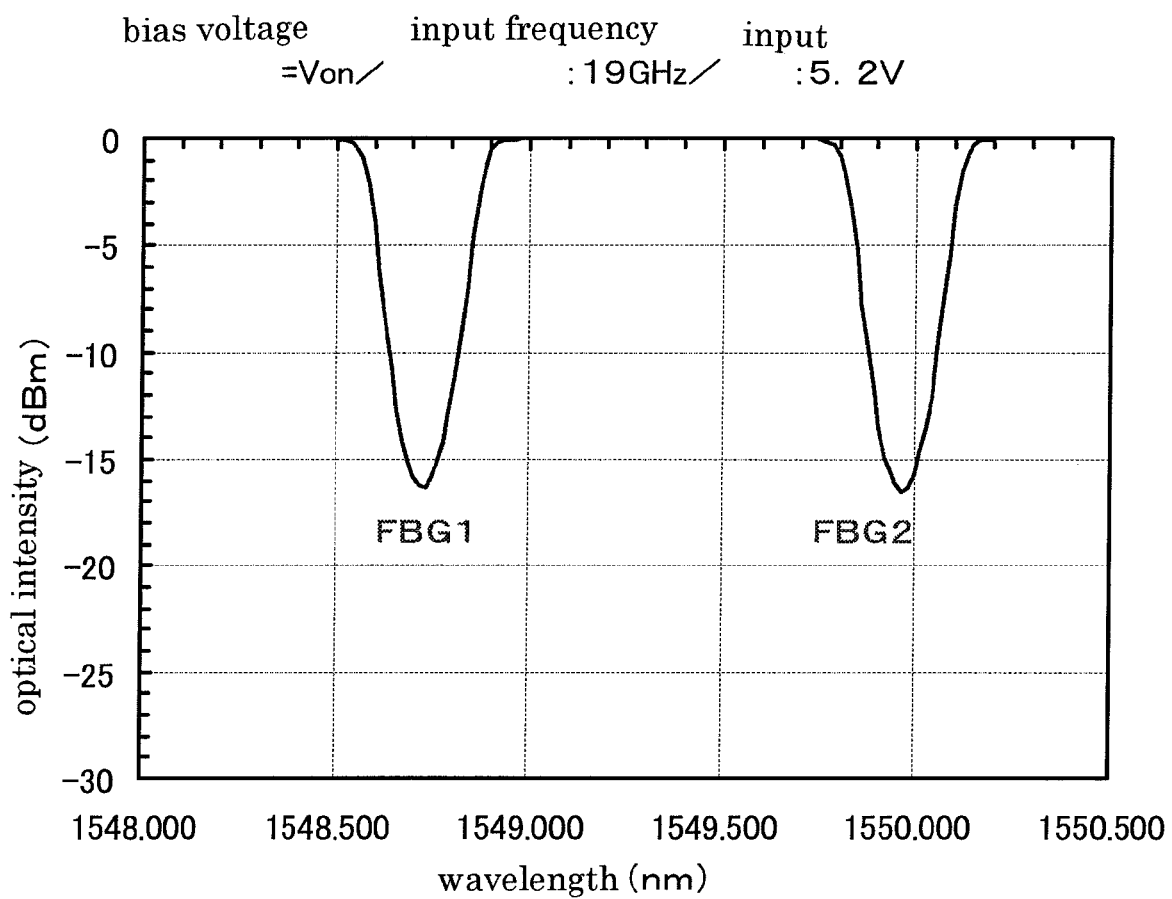
FIG. 21 is a graph showing the properties of an optical filter used in the example 3.
Figure 22:
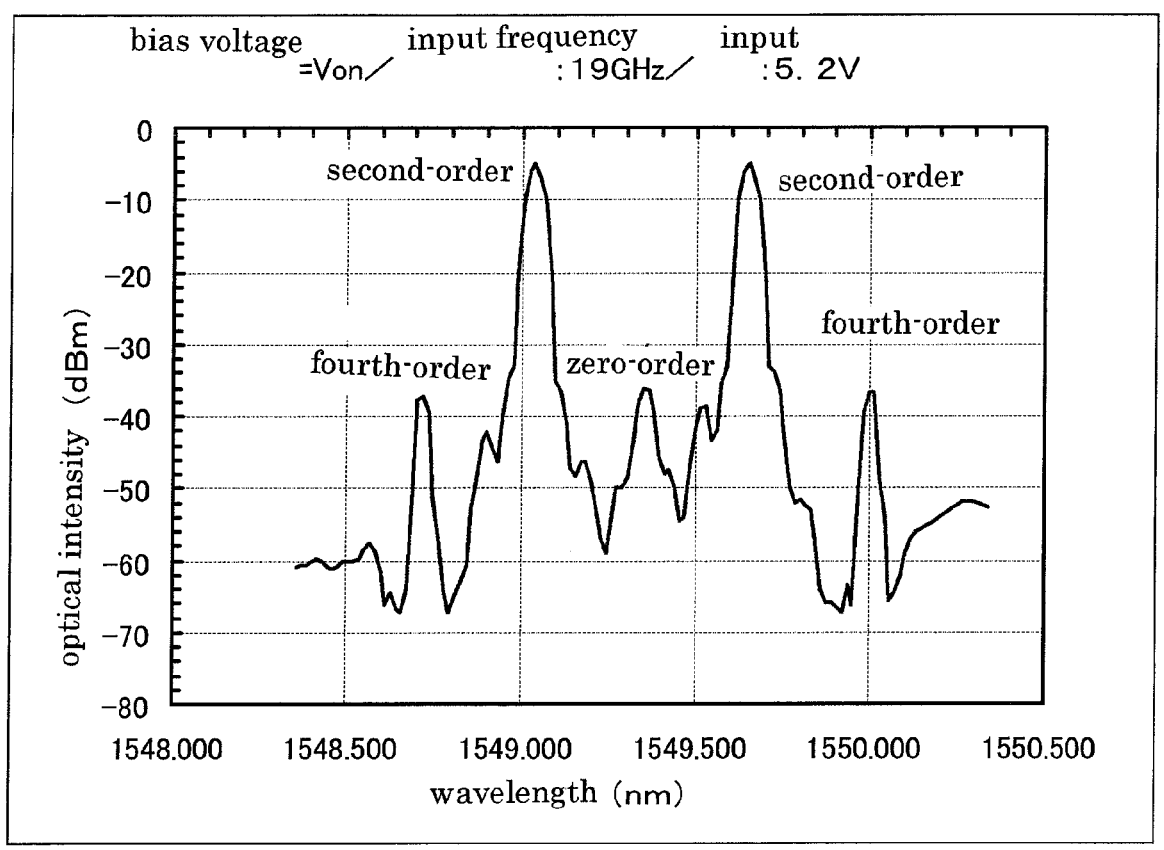
FIG. 22 is a graph showing distribution of wavelength-optical intensity of sideband wave according to the example 3, after an optical filter is inserted.

In this case, the light was further transmitted through a two-step FBG filter having reflection properties shown in FIG. 21. As a result, it was obtained the wave form of the optical modulation shown in FIG. 22.

Example 4

Figure 23:
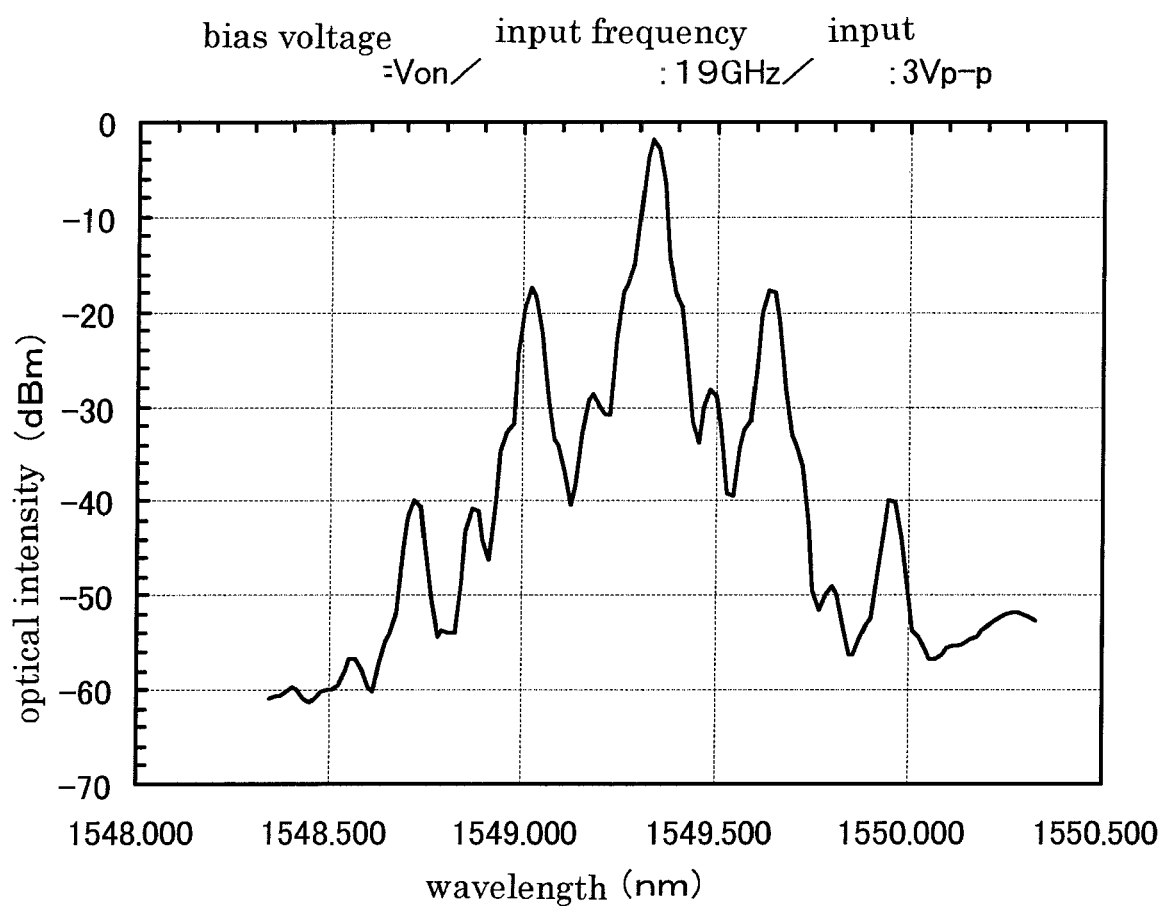
FIG. 23 is a graph showing distribution of wavelength-optical intensity of sideband wave according to an example 4.

It was produced the device according to the same procedure as the example 3. A DFB laser system of 1.55 μm was used, and the modulator was operated at operational point that the power of the light takes the maximum (Vb: ON state), at frequency of 19 GHz. The input voltage was made 3 Vp–p, and the spectral wave form of the modulated light was observed by an optical spectrum analyzer, to prove that it was obtained optical spectrum shown in FIG. 23. That is, the inhibition ratio of the optical carrier with respect to the second-order sideband wave was −15 dB, the inhibition ratio of the fourth-order sideband wave with respect to the second order sideband wave was 22 dB and the frequency between the sideband waves was proved to be 76 GHz (4×fm).

Figure 24:
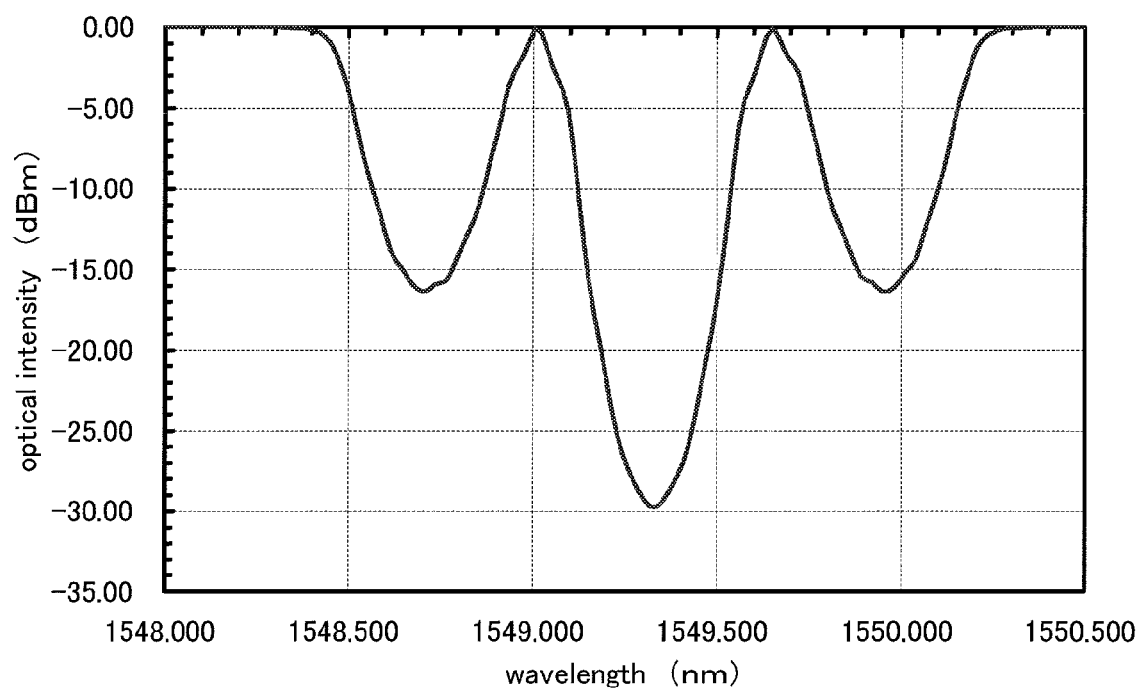
FIG. 24 is a graph showing the properties of an optical filter used in the example 4.
Figure 25:
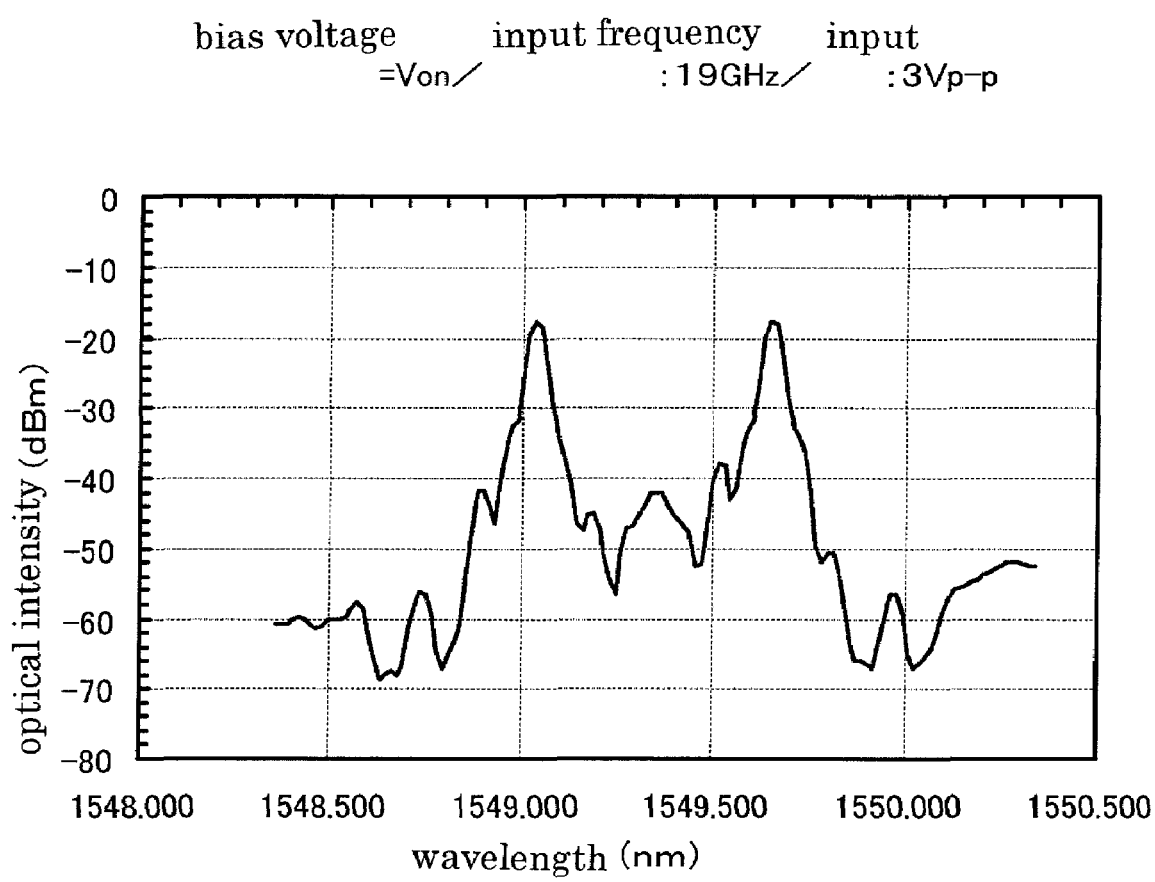
FIG. 25 is a graph showing distribution of wavelength-optical intensity of sideband wave according to the example 4, after an optical filter is inserted.

In this case, the light was further transmitted through a three-step FBG filter reflected at the central wavelengths of the optical carrier and both of the fourth-order sideband waves, respectively, as shown in FIG. 24. The wave form of the optical modulation shown in FIG. 25 was obtained, so that the inhibition ratio of the optical carrier can be 20 dB or more.

Although the present invention has been described referring to specific embodiments, the present invention is not limited to the specific embodiments and may be performed with various changes and modifications without departing from the attached claims.

The invention claimed is:

1. A radio signal radiation system comprising:
   an optical modulator;
   a light source for inputting an optical carrier wave "A" into said optical modulator;
   a power source for applying a modulating signal having a frequency fm on said optical modulator so as to superimpose a sideband wave "fm" onto said optical carrier wave "A", said modulating signal having an amplitude of n times ("n" representing an integer of 2 or more) of the driving voltage $V\pi$ of said optical modulator;
   a light receiver to receive an outgoing light "B" from said optical modulator and to convert said outgoing light into an electrical signal; and
   a radiating means for radiating a radio signal "C" based on said electrical signal,
   wherein said sideband wave is superimposed at a position shifted by a frequency of n×fm with respect to said optical carrier wave "A" to radiate said radio signal of a frequency n×fm.

2. The radio signal radiation system of claim 1, further comprising means for dividing outgoing light from said optical modulator to plural routes, wherein said light receiver and said radiating means are provided for each of said routes.

3. The radio signal radiation system of claim 1, wherein said optical modulator comprises an intensity modulator or a phase modulator.

4. The radio signal radiation system of claim 3, wherein said optical modulator comprises a substrate comprising an electro-optic material, an optical waveguide provided in said substrate and a traveling-wave type electrode for applying said modulating signal on said optical waveguide.

5. The radio signal radiation system of claim 4, wherein said traveling-wave type electrode has a gap width of 20 μm or smaller.

6. A radar system comprising the radio signal radiation system of claim 1, said radar system further comprising a receiving means for receiving a signal reflected from an object to obtain an information about said object based on said received signal and said radio signal.

7. The radar system of claim 6, further comprising an electrical dividing means for dividing said electrical signal outputted from said light receiver and a mixer for mixing said divided signal from said electrical dividing means and said received signal.

8. The radar system of claim 7, further comprising an optical dividing means for dividing outgoing light from said optical modulator for oscillation, wherein said radio signal is oscillated and said received signal is received based on each of said outgoing lights through a plurality of routes after said outgoing light is divided.

9. The radar system of claim 8, further comprising an optical dividing means for dividing outgoing light from said optical modulator for oscillation, an optical modulator for modulating the outgoing light for receiving said divided outgoing light and for modulating said outgoing light based on said received signal, and an additional light receiver for receiving said outgoing light from said optical modulator for modulating the outgoing light and converting said outgoing light to an electrical signal.

10. The radar system of claim 9, wherein said outgoing light from said optical modulator for oscillation is divided into a plurality of routes, and wherein said radio signal is oscillated and said received signal is received based on said outgoing light after the division of said outgoing light.

11. A radio signal radiation system for comprising:
    an optical modulator;
    a light source for inputting an optical carrier wave "A" into said optical modulator;
    a power source for applying a modulating signal having a frequency fm on said optical modulator so as to superimpose a sideband wave "fm" onto said carrier wave "A";
    a light receiver to receive an outgoing light "B" from said optical modulator and to convert said outgoing light into an electrical signal; and
    a radiating means for radiating a radio signal "C" based on said electrical signal, wherein said sideband wave is superimposed at a position shifted by a frequency n×fm ("n" represents an integer of 1 or more) with respect to said optical carrier wave "A" to radiate said radio signal of a frequency of 2×n×fm.

12. The radio signal radiation system of claim 11, wherein the inhibition ratio of the optical intensity of the sideband wave corresponding with an integer other than a desired integer with respect to the optical intensity of the sideband wave corresponding with said desired integer is 10 dB or more.

13. The radio signal radiation system of claim 12, wherein an optical filter is used for reducing the optical intensity of the sideband wave corresponding with the integer other than said desired integer.

14. The radio signal radiation system of claim 11, further comprising a means for dividing outgoing light from said optical modulator to plural routes, wherein said light receiver for oscillation and said radiating means are provided for each of said plural routes.

15. The radio signal radiation system of claim 11, wherein said optical modulator comprises an intensity modulator or a phase modulator.

16. The radio signal radiation system of claim 15, wherein said optical modulator comprises a substrate comprising an electro-optic material, an optical waveguide provided in said substrate and a traveling-wave type electrode for applying said modulating signal on said optical waveguide.

17. The radio signal radiation system of claim 16, wherein said traveling-wave type electrode has a gap width of 20 μm or smaller.

18. A radar system comprising the radio signal radiation system of claim 11, said radar system further comprising a receiving means for receiving a signal reflected from an object to obtain an information about said object based on said received signal and said radio signal.

19. The radar system of claim 18, further comprising an electrical dividing means for dividing said electrical signal outputted from said light receiver and a mixer for mixing said divided signal from said electrical dividing means and said received signal.

20. The radar system of claim 19, further comprising an optical dividing means for dividing outgoing light from said optical modulator for oscillation, wherein said radio signal is oscillated and said received signal is received based on each of said outgoing lights through a plurality of routes after said light is divided.

21. The radar system of claim 18, further comprising an optical dividing means for dividing outgoing light from said optical modulator for oscillation, an optical modulator for modulating the outgoing light for receiving said divided outgoing light and for modulating said outgoing light based on said received signal, and an additional light receiver for receiving said outgoing light from said optical modulator for modulating the outgoing light and converting said outgoing light to an electrical signal.

22. The radar system of claim 21, wherein said outgoing light from said optical modulator for oscillation is divided into a plurality of routes, and wherein said radio signal is oscillated and said received signal is received based on said outgoing light after the division of said outgoing light.

* * * * *